(12) United States Patent
Kamae et al.

(10) Patent No.: US 12,510,838 B2
(45) Date of Patent: Dec. 30, 2025

(54) TONER AND TWO-COMPONENT DEVELOPER

(71) Applicant: CANON KABUSHIKI KAISHA, Tokyo (JP)

(72) Inventors: Kentaro Kamae, Kanagawa (JP); Yuu Nishimura, Chiba (JP); Hisasuke Kajihara, Ibaraki (JP); Takaho Shibata, Tokyo (JP); Maki Imura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 474 days.

(21) Appl. No.: 18/185,422

(22) Filed: Mar. 17, 2023

(65) Prior Publication Data
US 2023/0305416 A1    Sep. 28, 2023

(30) Foreign Application Priority Data

Mar. 23, 2022    (JP) ................................. 2022-046564
Feb. 2, 2023    (JP) ................................. 2023-014757

(51) Int. Cl.
*G03G 9/08*    (2006.01)
*C08G 63/16*    (2006.01)
(Continued)

(52) U.S. Cl.
CPC ......... *G03G 9/08755* (2013.01); *C08G 63/16* (2013.01); *G03G 9/0819* (2013.01);
(Continued)

(58) Field of Classification Search
None
See application file for complete search history.

(56) References Cited

U.S. PATENT DOCUMENTS

| 7,833,687 | B2 | 11/2010 | Kato |
| 8,084,174 | B2 | 12/2011 | Hasegawa |

(Continued)

FOREIGN PATENT DOCUMENTS

| EP | 2 434 347 A1 | 3/2012 |
| EP | 3 106 922 A1 | 12/2016 |

(Continued)

OTHER PUBLICATIONS

Translation of JP 2017-026953.*

(Continued)

*Primary Examiner* — Peter L Vajda
(74) *Attorney, Agent, or Firm* — VENABLE LLP

(57) ABSTRACT

A toner including a toner particle containing a binder resin containing an amorphous polyester A and a crystalline polyester C, and a wax, and a silica fine particle, wherein the content of the crystalline polyester C is within a specific range, the softening point of the amorphous polyester A satisfies a specific relationship, and in an X-ray diffraction spectrum under a specific temperature condition for the toner, there is a peak corresponding to the crystalline polyester C, a wax index $A_{W1}$ and a crystalline polyester index $A_{C1}$ of the toner satisfy a specific relationship, the silica fine particle contains a silica fine particle A having a maximum diameter of primary particle in a specific range, and the average coverages of the surface of the toner before and after the toner is treated with hexane with the silica fine particle A satisfy a specific relationship.

9 Claims, 1 Drawing Sheet

(51) Int. Cl.
   *G03G 9/087*    (2006.01)
   *G03G 9/097*    (2006.01)

(52) U.S. Cl.
   CPC ......... *G03G 9/0821* (2013.01); *G03G 9/0825* (2013.01); *G03G 9/09733* (2013.01)

(56) References Cited

U.S. PATENT DOCUMENTS

| | | |
|---|---|---|
| 8,323,726 B2 | 12/2012 | Naka |
| 8,697,327 B2 | 4/2014 | Shibata |
| 8,921,023 B2 | 12/2014 | Baba |
| 8,927,188 B2 | 1/2015 | Naka |
| 8,974,994 B2 | 3/2015 | Kamae |
| 8,986,914 B2 | 3/2015 | Fujikawa |
| 9,057,970 B2 | 6/2015 | Ida |
| 9,058,924 B2 | 6/2015 | Komatsu |
| 9,063,443 B2 | 6/2015 | Ishigami |
| 9,348,247 B2 | 5/2016 | Ida |
| 9,540,483 B2 | 1/2017 | Ida |
| 9,665,023 B2 | 5/2017 | Kamae |
| 9,696,644 B2 | 7/2017 | Ida |
| 9,897,934 B2 | 2/2018 | Tamura |
| 9,915,885 B2 | 3/2018 | Katsumata |
| 9,969,834 B2 | 5/2018 | Ohtsu |
| 10,012,918 B2 | 7/2018 | Ishigami |
| 10,012,920 B2 | 7/2018 | Shibata |
| 10,012,921 B2 | 7/2018 | Kamae |
| 10,078,281 B2 | 9/2018 | Ida |
| 10,088,765 B2 | 10/2018 | Miyakai |
| 10,133,201 B2 | 11/2018 | Kamae |
| 10,203,619 B2 | 2/2019 | Yamashita |
| 10,216,108 B2 | 2/2019 | Iwasaki |
| 10,228,629 B2 | 3/2019 | Tamura |
| 10,234,777 B2 | 3/2019 | Ohtsu |
| 10,353,312 B2 | 7/2019 | Kamae |
| 10,423,090 B2 | 9/2019 | Ohtsu |
| 10,451,990 B2 | 10/2019 | Kamae |
| 10,514,624 B2 | 12/2019 | Tamura |
| 10,642,178 B2 | 5/2020 | Yamashita |
| 10,656,545 B2 | 5/2020 | Kamae |
| 10,775,710 B1 | 9/2020 | Kamae |
| 10,859,931 B2 | 12/2020 | Hashimoto |
| 10,877,386 B2 | 12/2020 | Murayama |
| 10,969,705 B2 | 4/2021 | Shirayama |
| 11,131,938 B2 | 9/2021 | Murayama |
| 11,429,032 B2 | 8/2022 | Shibata |
| 11,624,986 B2 | 4/2023 | Kanno |
| 11,662,670 B2 | 5/2023 | Hama |
| 11,675,283 B2 | 6/2023 | Kamae |
| 2010/0151377 A1 | 6/2010 | Uchino |
| 2014/0287353 A1 | 9/2014 | Sakamoto |
| 2017/0160660 A1 | 6/2017 | Hasegawa |
| 2017/0315463 A1 | 11/2017 | Onozaki |
| 2017/0371256 A1 | 12/2017 | Shirai |
| 2020/0183295 A1 | 6/2020 | Kanno |
| 2021/0055668 A1 | 2/2021 | Tamura |
| 2021/0181647 A1 | 6/2021 | Hashimoto |
| 2021/0181651 A1 | 6/2021 | Kanno |
| 2021/0278774 A1 | 9/2021 | Hashimoto |
| 2021/0278775 A1 | 9/2021 | Kamae |
| 2021/0286282 A1 | 9/2021 | Kobori |
| 2021/0302853 A1 | 9/2021 | Murata |
| 2021/0302854 A1 | 9/2021 | Kitamura |
| 2021/0397106 A1 | 12/2021 | Kobori |
| 2022/0050398 A1 | 2/2022 | Ooyama |
| 2022/0197163 A1 | 6/2022 | Kajihara |
| 2022/0197166 A1 | 6/2022 | Chimoto |
| 2022/0197174 A1 | 6/2022 | Kajihara |
| 2022/0342335 A1 | 10/2022 | Ochi |
| 2022/0373911 A1 | 11/2022 | Kamae |
| 2022/0373919 A1 | 11/2022 | Imura |

FOREIGN PATENT DOCUMENTS

| | | | |
|---|---|---|---|
| JP | 2016-33648 A | 3/2016 | |
| JP | 2017-026953 * | 2/2017 | ............. G03G 9/087 |
| JP | 2017-191148 A | 10/2017 | |
| JP | 2018-189954 A | 11/2018 | |
| JP | 2020-64140 A | 4/2020 | |
| WO | 2013/115409 A1 | 8/2013 | |

OTHER PUBLICATIONS

U.S. Appl. No. 18/180,430, Maki Imura, filed Mar. 8, 2023.
U.S. Appl. No. 18/181,105, Nobuhiro Yoshida, filed Mar. 9, 2023.
U.S. Appl. No. 18/182,548, Kenta Mitsuiki, filed Mar. 13, 2023.
U.S. Appl. No. 18/183,368, Hisasuke Kajihara, filed Mar. 14, 2023.
U.S. Appl. No. 18/333,853, Maki Imura, filed Jun. 13, 2023.

* cited by examiner

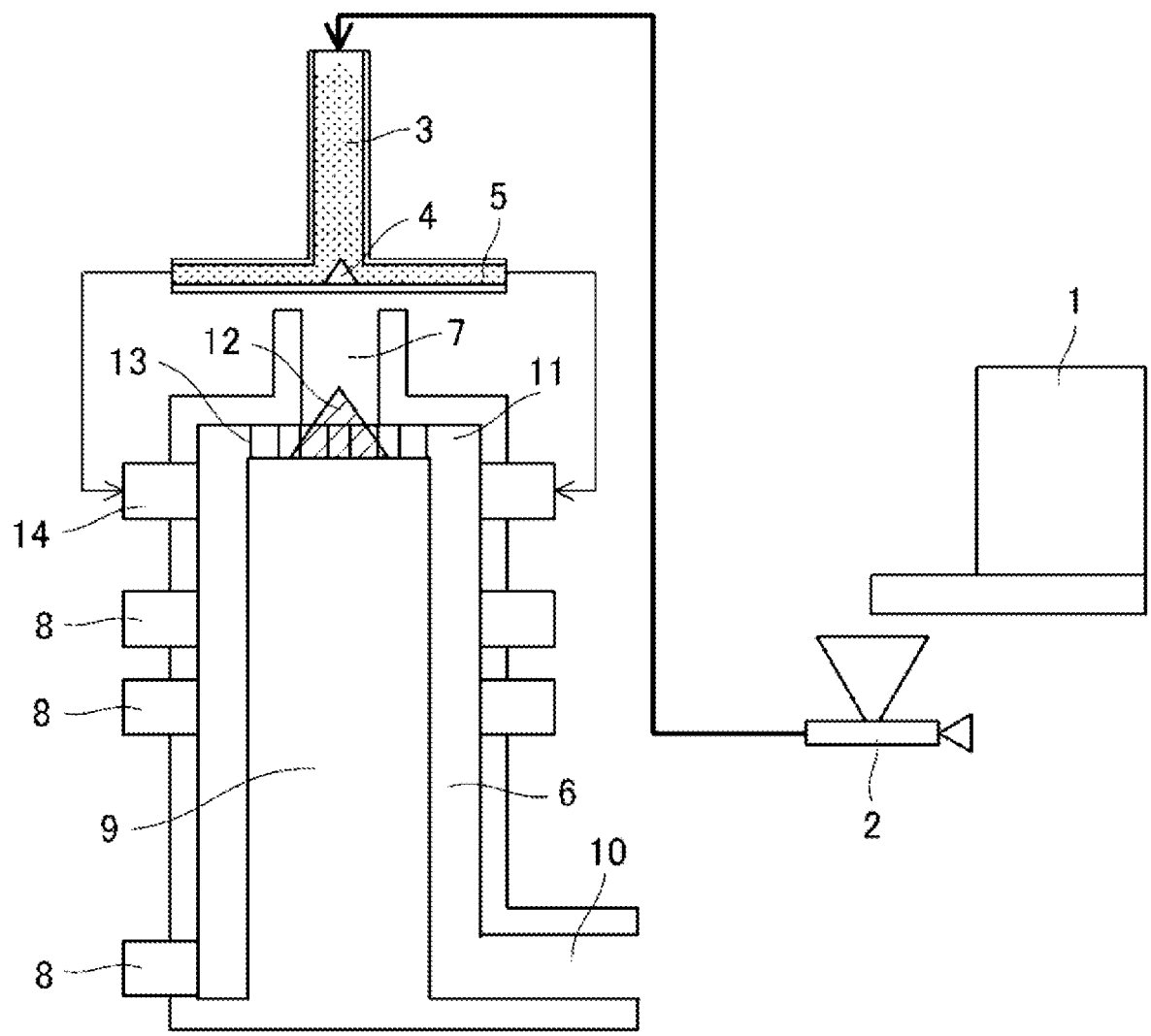

TONER AND TWO-COMPONENT DEVELOPER

BACKGROUND OF THE INVENTION

Field of the Invention

The present disclosure relates to a toner used in an electrophotographic system, an electrostatic recording system, an electrostatic printing system and the like and a two-component developer using the toner.

Description of the Related Art

In recent years, with the wide proliferation of electrophotographic full-color copying machines, additional performance improvements such as higher speeds and higher image quality have been required in addition to energy-saving performance and support for various media.

Specifically, as a toner for energy-saving, there is a demand for a toner that can be fixed at a lower temperature and has excellent low-temperature fixability in order to reduce power consumption in a fixing step.

In addition, since thick coated paper, which is one of various media, has high paper smoothness, and has a large load when loaded and the contact area thereof is large, the toner of a fixed image can be easily transferred to overlapping sheets of paper. That is, with regard to toners compatible with various media, toners having excellent image heat resistance are required.

For example, Japanese Patent Application Publication No. 2016-033648 proposes, as a toner having excellent low-temperature fixability and image heat resistance, a toner in which a crystalline portion and an amorphous portion in the crystalline polyester are controlled.

SUMMARY OF THE INVENTION

In the toner described in Japanese Patent Application Publication No. 2016-033648, the crystalline portion and the amorphous portion in the crystalline polyester resin are controlled to facilitate crystallization during cooling so that excellent low-temperature fixability and image heat resistance can be obtained. However, since the crystalline polyester is easily crystallized, when the toner is left under a high temperature and high humidity environment for a long time, blooming in which the crystalline polyester is exposed on the surface of the toner particle occurs. As a result, charge tends to leak from the portion in which blooming occurs, and a desired charge quantity may not be obtained.

As shown above, there is a problem of having all of low-temperature fixability, image heat resistance and charging performance.

The present disclosure provides a toner that exhibits excellent low-temperature fixability and image heat resistance, and exhibits excellent charging performance even when left under a high temperature and high humidity environment for a long time, and a two-component developer using the toner.

The present disclosure relates to a toner comprising
a toner particle comprising a binder resin and a wax, and
a silica fine particle on a surface of the toner particle,
wherein the binder resin comprises an amorphous polyester A and a crystalline polyester C, wherein, when a content of the crystalline polyester C in the toner based on a mass of the toner is defined as $W_C$ (mass %), the $W_C$ satisfies following Formula (1), $$5.0 \leq W_C \leq 20.0 \quad (1),$$

wherein, when a softening point of the amorphous polyester A measured with a flow tester is defined as $T_A$ (° C.), and a softening point of a molten mixture obtained by mixing the amorphous polyester A and the crystalline polyester C at a mass ratio of the amorphous polyester A and the crystalline polyester C in the toner is defined as $T_M$ (° C.), the $T_A$ and the $T_M$ satisfy following Formula (2), $$7.0 \leq T_A - T_M \leq 20.0 \quad (2),$$

wherein, in an X-ray diffraction spectrum at 45° C. when a temperature is raised from 25° C. to 100° C. and then lowered to 25° C. at a rate of 1° C./min, which is measured by a powder X-ray diffraction method for the toner, there is a peak corresponding to the crystalline polyester C, wherein a wax index $A_{W1}$ and a crystalline polyester index $A_{C1}$ calculated by following formula based on an FT-IR spectrum measured using an ATR method, using Ge as an ATR crystal, and under a condition of an angle of incidence of 45° of infrared light satisfy following Formula (3) and following Formula (4), $$0.29 \leq A_{W1} \leq 0.45 \quad (3)$$

$$0.009 \leq A_{C1} \leq 0.100 \quad (4)$$

$A_{W1}$=(an intensity of a peak belonging to —CH$_2$— derived from the wax in the toner)/(an intensity of a peak belonging to carbonyl derived from the amorphous polyester in the toner)

$A_{C1}$=(an intensity of a peak belonging to —CH$_2$— derived from the crystalline polyester in the toner)/(an intensity of a peak belonging to carbonyl derived from the amorphous polyester in the toner), and wherein the silica fine particle comprises a silica fine particle A having a maximum diameter of primary particle of 80 to 135 nm, and when an average coverage of the surface of the toner with the silica fine particle A having a maximum diameter of primary particle of 80 to 135 nm, which is measured by observing the toner under a scanning electron microscope, is defined as Sb (area %), and an average coverage of the surface of the toner with the silica fine particle A having a maximum diameter of primary particle of 80 to 135 nm, which is measured by observing the toner that has been treated with hexane under a scanning electron microscope is defined as Sa (area %), Sb and Sa satisfy following Formulae (5) and (6):

$$40.0 \leq Sb \leq 60.0 \quad (5)$$

$$Sb \leq Sa \quad (6).$$

According to the present disclosure, it is possible to provide a toner that exhibits excellent low-temperature fixability and image heat resistance, and exhibits excellent charging performance even when left under a high temperature and high humidity environment for a long time.

Further features of the present invention will become apparent from the following description of exemplary embodiments with reference to the attached drawing.

BRIEF DESCRIPTION OF THE DRAWINGS

The FIGURE shows an example of a heat sphering treatment device.

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. In addition, the monomer unit refers to a reacted form of the monomer substance in the polymer. In addition, the crystalline polyester is a resin that exhibits a clear endothermic peak in differential scanning calorimetric measurement (DSC).

The inventors have investigated a toner that has excellent low-temperature fixability and image heat resistance and has excellent charging performance even after being left under a high temperature and high humidity environment for a long time. First, the inventors verified the blooming mechanism. Regarding the fact that blooming is more likely to occur in the crystalline polyester than the wax, which is also a crystalline material, the difference between the two materials is, for example, their polarity and weight-average-molecular weight.

Therefore, a model sample in which the polarity or weight-average-molecular weight of the crystalline polyester is shifted to that of a wax was prepared, and the blooming sensitivity was checked. From the result, it was clarified that blooming is reduced by lowering the polarity, and blooming is promoted by lowering the weight-average-molecular weight.

As a result, blooming is thought to be caused by a force of a material that has not sufficiently crystallized and is in a compatible state with respect to a binder resin, migrates to the toner surface (Migration) under a high temperature and high humidity environment, and becomes a large crystal (Crystallization) and stabilizes.

On the other hand, when a crystalline polyester having a polarity and a weight-average-molecular weight such that it can be sufficiently crystallized with respect to a binder resin is used, blooming can be reduced. However, since such a crystalline polyester is incompatible with a binder resin at a high temperature at which the binder resin melts, a plasticizing effect cannot be obtained and excellent low-temperature fixability cannot be obtained.

In addition, when a crystalline polyester having a polarity and a weight-average-molecular weight that is sufficiently compatible with respect to a binder resin is used, blooming can be reduced. However, such a crystalline polyester is compatible with a binder resin at a low temperature at which the binder resin is solidified, and thus excellent image heat resistance cannot be obtained.

That is, the inventors has been reached the conclusion that there is a trade-off relationship between low-temperature fixability and image heat resistance, and a conclusion in which, in order to achieve both, not only a single technique for further increasing a crystallization rate of the crystalline polyester but also a complex technique that can reduce the slight occurrence of blooming even if such a crystalline polyester is used are necessary.

The inventors conducted further studies and tried to break away from the conventional ideas such as adjusting the polarity difference between the binder resin and the crystalline polyester and adjusting the molecular weight of the crystalline polyester as a method of further increasing the crystallization rate of the crystalline polyester. Thus, as a breakthrough technology, the inventors have found that the crystallization rate can be increased by strengthening the intermolecular force of the crystalline polyester itself.

Specifically, the inventors have found the importance of having a peak corresponding to a crystalline polyester C in the X-ray diffraction spectrum obtained under specific temperature conditions to be described below.

In addition, as a complex technique that can curb slight occurrence of blooming that may occur if a crystalline polyester is used, the inventors tried to break away from conventional ideas such as shell formation with another resin. This is because shell formation impairs low-temperature fixability, which is a prerequisite. Therefore, the inventors investigated a shell formation technique that does not inhibit fixing. They found, as a breakthrough technology, a shell formation technique that does not inhibit fixing.

Specifically, they found that blooming of the crystalline polyester can be reduced by appropriately covering the surface of the toner particle with a wax having a melting point and sharp melting characteristics. Here, they found the importance of covering the surface of the toner particle with a wax.

In addition, they found the importance of controlling the coverage of silica fine particles on the surface of the toner particle in order to prevent charging performance from deteriorating due to the effect of the wax on the surface of the toner particle.

The toner comprises a binder resin.

The binder resin comprises an amorphous polyester A and a crystalline polyester C.

$W_C$ (mass %) is the content of the crystalline polyester C in the toner based on the mass of the toner. $W_C$ (mass %) satisfies following formula.

$$5.0 \leq W_C \leq 20.0 \quad (1)$$

When the content of the crystalline polyester C is within the above range, there is a sufficient amount of the crystalline polyester C that plasticizes the amorphous polyester A and thus excellent low-temperature fixability can be obtained.

On the other hand, when the content of the crystalline polyester C is less than 5.0 mass %, excellent low-temperature fixability cannot be obtained because the amount of the crystalline polyester C that plasticizes the amorphous polyester A is small. In addition, when the content of the crystalline polyester C is more than 20.0 mass %, blooming of the crystalline polyester C cannot be reduced simply with a wax that appropriately covers the surface of the toner particle. Therefore, charges tend to leak from that portion, and a desired charge quantity cannot be obtained.

$W_C$ (mass %) is preferably 7.0 to 15.0, and more preferably 8.0 to 12.0.

$T_A$ (° C.) is the softening point of the amorphous polyester A measured with a flow tester. In addition, $T_M$ (° C.) is the softening point of a molten mixture obtained by mixing the amorphous polyester A and the crystalline polyester C at a mass ratio of the amorphous polyester A and the crystalline polyester C in the toner. In this case, $T_A$-$T_M$ is 7.0° C. to 20.0° C. When $T_A$-$T_M$ is within the above range, this indicates that the amorphous polyester A is sufficiently plasticized so that excellent low-temperature fixability can be obtained.

On the other hand, when $T_A$-$T_M$ is less than 7.0° C., this indicates that the amorphous polyester A is not sufficiently plasticized and excellent low-temperature fixability cannot be obtained. In addition, when $T_A$-$T_M$ is larger than 20.0° C., this indicates that the content of the crystalline polyester C is more than an amount at which the amorphous polyester A is sufficiently plasticized. Therefore, since blooming of the crystalline polyester C cannot be reduced simply with a wax that appropriately covers the surface of the toner particle, charges tend to leak from that portion, and a desired charge quantity cannot be obtained.

$T_A$-$T_M$ is preferably 8.0 to 15.0° C., and more preferably 9.0 to 12.0° C. $T_A$-$T_M$ can be controlled by controlling the softening point, the SP value and the weight-average-molecular weight by selecting the monomer of the amorphous polyester A and by controlling the content of the amorphous polyester A and the crystalline polyester C.

$T_A$ is preferably 105.0 to 125.0° C., and more preferably 110.0 to 120.0° C.

In the X-ray diffraction spectrum at 45° C. when the temperature is raised from 25° C. to 100° C. and then lowered to 25° C. at a rate of 1° C./min, which is measured by a powder X-ray diffraction method (XRD) for the toner, there is a peak corresponding to the crystalline polyester C.

When there is a peak corresponding to the crystalline polyester C in the above measurement, this indicates that the crystallization rate of the crystalline polyester C is high, and the crystalline polyester C in the toner on the fixed image can be phase-separated. Therefore, excellent image heat resistance can be obtained. On the other hand, when there is no peak corresponding to the crystalline polyester C, this indicates that the crystallization rate of the crystalline polyester C is low, and the crystalline polyester C in the toner on the fixed image is compatible. Therefore, excellent image heat resistance cannot be obtained.

In the X-ray diffraction spectrum at 45° C., in order to have a peak of the crystalline polyester C, for example, a chain length difference between a linear aliphatic polyhydric alcohol and a linear aliphatic polycarboxylic acid is kept constant, and a chain length of a linear aliphatic polyhydric alcohol is shortened. When the density of the ester bond moiety in the crystalline polyester increases, the intermolecular force increases, folding is promoted from this, and crystallization acceleration can increase.

$A_{W1}$ is the wax index calculated by the following formula based on the FT-IR spectrum obtained by performing measurement using the ATR method, using Ge as the ATR crystal and under a condition of an angle of incidence of 45° of infrared light. In this case, $A_{W1}$ satisfies the following Formula (3).

$$0.29 \leq A_{W1} \leq 0.45 \quad (3)$$

$A_{W1}$=(an intensity of a peak belonging to —$CH_2$— derived from the wax in the toner)/(an intensity of a peak belonging to carbonyl derived from the amorphous polyester in the toner)

When $A_{W1}$ is within the above range, this indicates that the surface of the toner particle is appropriately covered with a wax, and blooming of the crystalline polyester C can be reduced, and thus excellent charging performance can be obtained.

When $A_{W1}$ is less than 0.29, since the amount of the wax that covers the surface of the toner particle is small, blooming of the crystalline polyester C cannot be reduced. Therefore, charges tend to leak from that portion, a desired charge quantity cannot be obtained, and excellent charging performance cannot be obtained. On the other hand, when $A_{W1}$ is larger than 0.45, since the amount of the wax that covers the surface of the toner particle is sufficiently large, blooming of the crystalline polyester C can be reduced. However, the wax transfers to the magnetic carrier with which the toner comes into contact, which may affect charging performance, such as inhibiting chargeability of the magnetic carrier. In addition, when $A_{W1}$ is larger than 0.45, since the number of polar groups on the surface of the toner particle is too small in the first place, even in a one-component developer, charging performance with a member such as a blade tends to deteriorate.

$A_{W1}$ is preferably 0.34 to 0.43, more preferably 0.37 to 0.41, and still more preferably 0.38 to 0.40.

$A_{W1}$ can be controlled by adjusting the amount of the wax or a heat treatment of the toner particle. More specifically, $A_{W1}$ can be increased by increasing the amount of the wax or by raising the heat treatment temperature of the toner particle. On the other hand, $A_{W1}$ can be reduced by reducing the amount of the wax or lowering the heat treatment temperature of the toner particle.

$A_{C1}$ is a crystalline polyester index calculated by following formula based on an FT-IR spectrum measured using an ATR method, using Ge as an ATR crystal, and under a condition of an angle of incidence of 45° of infrared light. In this case, $A_{C1}$ satisfies following Formula (4).

$$0.009 \leq A_{C1} \leq 0.100 \quad (4)$$

$A_{C1}$=(an intensity of a peak belonging to —$CH_2$— derived from the crystalline polyester in the toner)/(an intensity of a peak belonging to carbonyl derived from the amorphous polyester in the toner)

When $A_{C1}$ is within the above range, this indicates that the crystalline polyester C is not present on the surface of the toner particle. Therefore, blooming of the crystalline polyester C can be reduced and excellent charging performance can be obtained.

When $A_{C1}$ is less than 0.009, this indicates that $A_{W1}$ is relatively large. Therefore, the wax transfers to the magnetic carrier with which the toner comes into contact, which may affect charging performance, such as inhibiting chargeability of the magnetic carrier.

On the other hand, when $A_{C1}$ exceeds 0.100, this indicates that an excess of the crystalline polyester C is present on the surface of the toner particle. Therefore, charges tend to leak from that portion, a desired charge quantity cannot be obtained, and excellent charging performance cannot be obtained.

$A_{C1}$ is preferably 0.010 to 0.040, more preferably 0.010 to 0.020, and still more preferably 0.010 to 0.015.

$A_{C1}$ can be controlled according to the amount of crystalline polyester added and a heat treatment of the toner particle. More specifically, $A_{C1}$ can be increased by increasing the amount of the crystalline polyester or by lowering the heat treatment temperature of the toner particle. On the other hand, $A_{C1}$ can be reduced by reducing the amount of the crystalline polyester or by raising the heat treatment temperature of the toner particle.

The toner comprises silica fine particles on the surface of the toner particle as an external additive. Here, Sb (area %) is the average coverage of the silica fine particle on the surface of the toner, which is measured by observing the toner under a scanning electron microscope. In addition, Sa (area %) is the average coverage of the silica fine particle on the surface of the toner, which is measured by observing the toner that has been treated with hexane under a scanning electron microscope. Here, the silica fine particles used when Sb and Sa are calculated are silica fine particles A having a maximum diameter of primary particle of 80 nm to 135 nm.

In this case, Sb and Sa satisfy following Formulae (5) and (6).

$$40.0 \leq Sb \leq 60.0 \quad (5)$$

$$Sb < Sa \quad (6)$$

When Sb is within the above range, this indicates that silica fine particles serving as spacers are present on the surface of the toner particle, and even if the surface of the toner particle is appropriately covered with a wax, the transfer of the wax to the magnetic carrier or the like is restricted, and thus excellent charging performance can be obtained. In addition, since there is no excess wax having no polar group on the surface of the toner particle, even in a one-component developer, excellent charging performance with a member such as a blade can be obtained.

When Sb is less than 40.0 area %, this indicates that there are few silica fine particles serving as spacers on the surface of the toner, and the wax transfers to the magnetic carrier with which the toner comes into contact, chargeability of the magnetic carrier is inhibited, and thus excellent charging performance cannot be obtained. In addition, when Sb is larger than 60.0 area %, since excessive silica fine particles are present on the surface of the toner, melting at the temperature of the toner is inhibited, and excellent low-temperature fixability cannot be obtained.

Sb (area %) is preferably 42.0 to 50.0, and more preferably 43.0 to 47.0. Sb can be controlled according to the amount of the silica fine particle added and the heat treatment of the toner particle.

The average coverages Sb and Sa of the silica fine particle satisfy Sb<Sa as shown in Formula (6). When Sb and Sa are within the above range, this indicates that the coverage of the silica fine particle is high after a hexane treatment. When silica fine particles adhere to the side of the toner particle surface on which the wax is present, and some silica is embedded, and some of the silica fine particles are covered with a wax. Since the wax that covers the silica fine particle is dissolved by a hexane treatment, the coverage of the silica fine particle is improved in the measurement. Therefore, Sb<Sa indicates that the silica fine particle is present on the surface of the toner particle on which the wax is present. With such a structure, the transfer of the wax to the magnetic carrier can be restricted, and excellent charging performance can be obtained.

On the other hand, when silica fine particles are present on the surface on which the amorphous polyester A is present, the wax is dissolved by a hexane treatment, but the amorphous polyester A is not dissolved, and thus Sb and Sa do not change.

On the other hand, when Sb≥Sa, this indicates that silica fine particles are not present on the surface of the toner on which the wax is present, and thus the wax transfers to the magnetic carrier with which the toner comes into contact, the chargeability of the magnetic carrier is inhibited, and thus excellent charging performance cannot be obtained.

Sb (area %) is preferably 45.0 to 65.0, and more preferably 47.0 to 55.0. Sa-Sb is preferably 1.0 to 10.0 and more preferably 3.0 to 7.0.

As a method of adjusting the coverage Sb, before a heat sphering treatment to be described below, the silica fine particles are externally added, the surface of the toner is melted during the heat sphering treatment, and the silica fine particles are embedded for adjustment.

The number-based median diameter (D50) of the silica fine particle is preferably 80 to 135 nm and more preferably 110 to 130 nm.

An integrated intensity of a crystal structure of the crystalline polyester C is defined as $C_C$ in an X-ray diffraction spectrum at 45° C. when the temperature is raised from 25° C. to 100° C. and then lowered to 25° C. at a rate of 1° C./min, which is measured by a powder X-ray diffraction method for the crystalline polyester C. And an integrated intensity of a crystal structure of the crystalline polyester C is defined as $C_T$ in an X-ray diffraction spectrum at 45° C. when the temperature is raised from 25° C. to 100° C. and then lowered to 25° C. at a rate of 1° C./min, which is measured by a powder X-ray diffraction method for the toner. In this case, $C_C$ and $C_T$ satisfy following Formula (7).

$$0.7 \leq C_T/(C_C \times W_C) \leq 0.9 \quad (7)$$

$C_T/(C_C \times W_C)$ represents the degree of crystallinity of the crystalline polyester in the toner.

When $C_T/(C_C \times W_C)$ is 0.7 or more, this indicates that the crystallization rate of the crystalline polyester C is high, and the crystalline polyester C of the toner on the fixed image can be phase-separated, and thus excellent image heat resistance can be obtained. When $C_T/(C_C \times W_C)$ is 0.9 or less, excellent low-temperature fixability can be obtained because the crystalline polyester is not excessively phase-separated.

$C_T/(C_C \times W_C)$ can be increased by increasing the density of the ester bond moiety in the crystalline polyester, increasing the intermolecular force, promoting folding from there, and increasing the crystallization acceleration. In addition, $C_T/(C_C \times W_C)$ can be reduced by reducing the polarity difference between the crystalline polyester and the amorphous polyester.

The crystalline polyester C is preferably a condensation polymer of an alcohol component containing the linear aliphatic polyhydric alcohol c1 having 2 to 6 carbon atoms (preferably 2 to 4 carbon atoms, more preferably 2 or 3 carbon atoms, and still more preferably 2 carbon atoms) and a carboxylic acid component containing the linear aliphatic polycarboxylic acid c2. A condensation polymer of the linear aliphatic polyhydric alcohol c1 having 2 to 6 carbon atoms and the linear aliphatic polycarboxylic acid c2 is more preferable.

Here, the difference (absolute difference) between the number of carbon atoms of the linear aliphatic polyhydric alcohol c1 and the number of carbon atoms of the linear aliphatic polycarboxylic acid c2 is preferably 8 or more, more preferably 9 or more, and still more preferably 10 or more. The upper limit is not particularly limited, and is preferably 14 or less, more preferably 12 or less, and still more preferably 11 or less.

When the carbon number difference between c1 and c2 is 8 or more, the density of the ester bond moiety in the crystalline polyester C is high, the intermolecular force increases, and folding is promoted from this. As a result, the crystallization rate of the crystalline polyester C is high, and the crystalline polyester C of the toner on the fixed image is more likely to be phase-separated, and thus excellent image heat resistance can be obtained. When the carbon number difference is 14 or less, the low-temperature fixability tends to be better.

When a melting point (° C.) of the crystalline polyester C is defined as $T_C$, the $T_C$ satisfies following Formula (8).

$$87 \leq T_C \leq 92 \quad (8)$$

When the melting point $T_C$ is within the above range, the intermolecular force increases, and folding is promoted from this. Therefore, the crystallization rate of the crystalline polyester C is high, and the crystalline polyester C of the toner on the fixed image can be more phase-separated, and thus excellent image heat resistance can be obtained. $T_C$(° C.) is more preferably 88 to 91° C., and more preferably 89 to 91° C.

The amorphous polyester A is preferably a condensation polymer of an alcohol component containing the linear aliphatic polyhydric alcohol a1 having 2 to 10 carbon atoms (preferably 2 to 6 carbon atoms, more preferably 2 to 4 carbon atoms, and still more preferably 2 carbon atoms) and a carboxylic acid component.

Here, the difference (absolute difference) between the number of carbon atoms of the linear aliphatic polyhydric alcohol a1 and the number of carbon atoms of the linear aliphatic polyhydric alcohol c1 is preferably 4 or less, more preferably 2 or less, and still more preferably 1 or less. The lower limit is not particularly limited and is 0 or more. The carbon number difference is particularly preferably 0.

When the carbon number difference between a1 and c1 is 4 or less, this indicates that similar units are present in the amorphous polyester A and the crystalline polyester C, and the affinity between the amorphous polyester and the crystalline polyester is high, and thus excellent low-temperature fixability can be obtained.

A crystalline polyester index (after vacuum storage) calculated from an FT-IR spectrum obtained using the toner stored in a vacuum at 50° C. for 5 days as a sample, using an ATR method, using Ge as an ATR crystal and under a condition of an angle of incidence of 45° of infrared light is defined as $A_{C2}$. In that case, the $A_{C1}$ and the $A_{C2}$ satisfy following Formula (9):

$$A_{C2}/A_{C1} \leq 1.2 \qquad (9).$$

When $A_{C2}/A_{C1}$ is 1.2 or less, this indicates that blooming of the crystalline polyester C is reduced, and better charging performance can be obtained.

$A_{C2}/A_{C1}$ is more preferably 1.1 or less. The lower limit is not particularly limited, and is preferably 1.0 or more. $A_{C2}/A_{C1}$ can be controlled by the amount of crystalline polyester added and a heat treatment of the toner particle.

The SP value $(cal/cm^3)^{0.5}$ of the crystalline polyester C is $SP_C$. The $SP_C$ is preferably 9.4 to 10.7 $(cal/cm^3)^{0.5}$, more preferably 9.4 to 10.4 $(cal/cm^3)^{0.5}$, still more preferably 9.5 to 10.2 $(cal/cm^3)^{0.5}$, and yet more preferably 9.6 to 10.1 $(cal/cm^3)^{0.5}$.

In addition, the SP value $(cal/cm^3)^{0.5}$ of the amorphous polyester A is $SP_A$. The $SP_A$ is preferably 10.4 to 11.5 $(cal/cm^3)^{0.5}$, more preferably 10.6 to 11.4 $(cal/cm^3)^{0.5}$, still more preferably 10.8 to 11.2 $(cal/cm^3)^{0.5}$, and yet more preferably 10.9 to 11.1 $(cal/cm^3)^{0.5}$.

Amorphous Polyester A

The amorphous polyester A is preferably a condensation polymer of a polyhydric alcohol (alcohols of divalent or trivalent or higher), a polycarboxylic acid (carboxylic acids of divalent or trivalent or higher), and an acid anhydride or lower alkyl ester thereof.

The following polyhydric alcohol monomers can be used as the polyhydric alcohol monomer used for the amorphous polyester A.

Examples of dihydric alcohol components include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and bisphenols represented by a formula (A) and derivatives thereof.

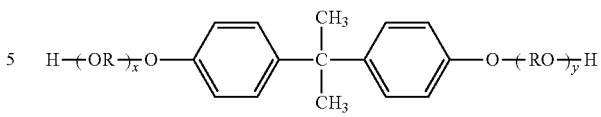

(In the formula (A), R represents an ethylene group or a propylene group, x and y are each an integer of 0 or more, and the average value of x+y is from 0 to 10.)

And the examples includes the diols represented by a formula (B).

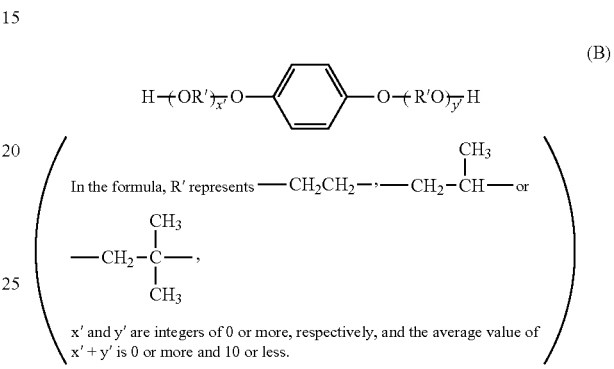

Examples of trihydric or higher alcohol components include sorbitol, 1,2,3,6-hexanetetrol, 1,4-sorbitan, pentaerythritol, dipentaerythritol, tripentaerythritol, 1,2,4-butanetriol, 1,2,5-pentantriol, glycerol, 2-methylpropanetriol, 2-methyl-1,2,4-butanetriol, trimethylolethane, trimethylolpropane, and 1,3,5-trihydroxymethylbenzene. Of these, glycerol, trimethylolpropane, and pentaerythritol are preferably used. These divalent alcohols and trihydric or higher alcohols can be used alone or in combination of two or more.

As the polyvalent carboxylic acid monomer to be used for the polyester resin, the following polyvalent carboxylic acid monomers can be used.

Examples of divalent carboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, anhydrides of these acids and lower alkyl esters thereof. Of these, maleic acid, fumaric acid, terephthalic acid, and n-dodecenyl succinic acid are preferably used.

Examples of trivalent or higher carboxylic acids, acid anhydrides thereof or lower alkyl esters thereof include 1,2,4-benzenetricarboxylic acid, 2,5,7-naphthalentricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, acid anhydrides thereof or lower alkyl esters thereof.

Of these, 1,2,4-benzenetricarboxylic acid, that is, trimellitic acid or a derivative thereof, is preferably used because such acid is inexpensive and reaction control thereof is easy.

These divalent carboxylic acids and the like and trivalent or higher carboxylic acids can be used alone or in combination of two or more.

Among these, as described above, the alcohol component preferably contains a linear aliphatic polyhydric alcohol a1 having 2 to 10 carbon atoms and more preferably contains ethylene glycol in consideration of the functionality and affinity of the linear aliphatic polyhydric alcohol c1. In addition, the alcohol component preferably contains a bisphenol represented by Formula (A). On the other hand, the carboxylic acid component preferably contains terephthalic acid.

The amorphous polyester A contains preferably 10 to 35 mass % and more preferably 15 to 25 mass % of monomer units of a linear aliphatic polyhydric alcohol a1 having 2 to 10 carbon atoms. The amorphous polyester A contains preferably 25 to 50 mass % and more preferably 35 to 45 mass % of monomer units of a bisphenol represented by Formula (A). The amorphous polyester A contains preferably 25 to 50 mass % and more preferably 35 to 45 mass % of monomer units of terephthalic acid.

A method for producing the polyester resin is not particularly limited, and a known method can be used. For example, the above-mentioned alcohol monomer and carboxylic acid monomer are simultaneously charged and polymerized through an esterification reaction or a transesterification reaction and a condensation reaction to produce a polyester resin. In addition, the polymerization temperature is not particularly limited and is preferably in a range of 180 to 290° C. When the polyester is polymerized, polymerization catalysts, for example, titanium-based catalysts, tin-based catalysts, zinc acetate, antimony trioxide, and germanium dioxide can be used. Particularly, the amorphous polyester A is more preferably a polyester resin polymerized using a tin-based catalyst.

The amorphous polyester A may be a hybrid resin comprising other resin components as long as it comprises an amorphous polyester as a main component. The content of the main component is from 50 to 100 mass %, preferably from 80 to 100 mass %, and more preferably from 90 to 100 mass %. For example, a hybrid resin of a polyester resin and a vinyl resin may be exemplified. Examples of methods of obtaining reaction products of vinyl resins and polyester resins such as hybrid resins include the following method. In the presence of monomer components that can react with each of a vinyl resin and a polyester resin, a method of performing a polymerization reaction of either or both of the resins is preferable.

For example, among monomers constituting a polyester resin component, those that can react with a vinyl copolymer include, for example, unsaturated dicarboxylic acids such as phthalic acid, maleic acid, citraconic acid, and itaconic acid and anhydrides thereof. Among monomers constituting a vinyl copolymer component, monomers that can react with a polyester resin component include those having a carboxyl group or a hydroxy group and acrylic acid or methacrylic acid esters.

In addition, as the binder resin, as long as the above effect is not impaired, in addition to the crystalline polyester C and the amorphous polyester A, various resin compounds known as the binder resin can be used together. Examples of such resin compounds include a phenolic resin, natural resin-modified phenolic resin, natural resin-modified maleic resin, acrylic resin, methacrylic resin, polyvinyl acetate resin, silicone resin, polyester resin, polyurethane, polyamide resin, furan resin, epoxy resin, xylene resin, polyvinyl butyral, terpene resin, coumarone-indene resin, and petroleum resin.

The content of the crystalline polyester C and the amorphous polyester A in the binder resin is preferably from 50 to 100 mass %, more preferably from 80 to 100 mass %, still more preferably from 90 to 100 mass %, and yet more preferably from 95 to 100 mass %.

The content of the amorphous polyester A in the binder resin is preferably from 80.0 to 97.0 mass %, more preferably from 85.0 to 95.0 mass %, and still more preferably from 86.0 to 90.0 mass %.

In addition, the peak molecular weight of the amorphous polyester A is preferably from 3,500 to 20,000 in consideration of low-temperature fixability and scratch resistance. In addition, the acid value of the amorphous polyester A is preferably from 5 to 30 mg KOH/g in consideration of charge retention under a high temperature and high humidity environment. In addition, the hydroxyl value of the amorphous polyester A is preferably from 20 to 70 mg KOH/g in consideration of low-temperature fixability and charge retention.

Crystalline Polyester C

As the monomer used in the crystalline polyester C, a polyhydric alcohol (alcohols of divalent or trivalent or higher), a polycarboxylic acid (carboxylic acids of divalent or trivalent or higher), and an acid anhydride or lower alkyl ester thereof are used. The crystalline polyester C is preferably a condensation polymer of an aliphatic dicarboxylic acid and an aliphatic diol.

As the polyhydric alcohol monomer used in the crystalline polyester C, the following polyhydric alcohol monomers can be used. The polyhydric alcohol monomer is not particularly limited, and is preferably a chain (more preferably, a linear) aliphatic diol, and examples thereof include ethylene glycol, diethylene glycol, triethylene glycol, 1,2-propylene glycol, 1,3-propylene glycol, dipropylene glycol, 1,4-butanediol, 1,4-butadiene glycol, trimethylene glycol, tetramethylene glycol, pentamethylene glycol, hexamethylene glycol, octamethylene glycol, nonamethylene glycol, decamethylene glycol, and neopentyl glycol. Among these, particularly, linear aliphatics such as ethylene glycol, diethylene glycol, 1,4-butanediol, and 1,6-hexanediol, and $\alpha,\omega$-diol are preferably exemplified.

Polyhydric alcohol monomers other than the above polyhydric alcohol can be used. Among the polyhydric alcohol monomers, examples of divalent alcohol monomers include aromatic alcohols such as polyoxyethylenated bisphenol A and polyoxypropylenated bisphenol A; and 1,4-cyclohexanedimethanol. In addition, among the polyhydric alcohol monomers, examples of polyhydric alcohol monomers of trivalent or higher include aromatic alcohols such as 1,3,5-trihydroxymethylbenzene; and aliphatic alcohols such as pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, and trimethylolpropane.

As the polycarboxylic acid monomer used in the crystalline polyester C, the following polycarboxylic acid monomers can be used. The polycarboxylic acid monomer is not particularly limited, and is preferably a chain (more preferably, linear) aliphatic dicarboxylic acid.

Specific examples include oxalic acid, malonic acid, succinic acid, glutaric acid, adipic acid, pimelic acid, suberic acid, glutaconic acid, azelaic acid, sebacic acid, nonanedicarboxylic acid, decanedicarboxylic acid, undecanedicarboxylic acid, dodecane dicarboxylic acid, maleic acid, fumaric acid, mesaconic acid, citraconic acid, and itaconic acid, and hydrolyzed acid anhydrides or lower alkyl esters thereof.

A polycarboxylic acid other than the above polycarboxylic acid monomers can be used. Among other polycarboxylic acid monomers, examples of divalent carboxylic acids include aromatic carboxylic acids such as isophthalic acid and terephthalic acid; aliphatic carboxylic acids such as n-dodecyl succinic acid and n-dodecenyl succinic acid; and alicyclic carboxylic acids such as cyclohexanedicarboxylic acid, and also include acid anhydrides or lower alkyl esters thereof.

In addition, among other carboxylic acid monomers, examples of polycarboxylic acids of trivalent or higher include aromatic carboxylic acids such as 1,2,4-benzenetricarboxylic acid (trimellitic acid), 2,5,7-naphthalenetricarboxylic acid, 1,2,4-naphthalenetricarboxylic acid, and pyromellitic acid, and aliphatic carboxylic acids such as 1,2,4-butanetricarboxylic acid, 1,2,5-hexanetricarboxylic acid, and 1,3-dicarboxyl-2-methyl-2-methylenecarboxypropane, and also include derivatives of acid anhydrides or lower alkyl esters thereof.

Among these, as described above, it is preferable to use a linear aliphatic polyhydric alcohol c1 having 2 to 6 carbon atoms. The linear aliphatic polyhydric alcohol c1 is more preferably ethylene glycol because the melting point increases, the intermolecular force increases, and folding is promoted from this.

In addition, the linear aliphatic polycarboxylic acid c2 preferably has 8 to 18 carbon atoms, more preferably 9 to 16 carbon atoms, and still more preferably 10 to 14 carbon atoms. The linear aliphatic polycarboxylic acid c2 is more preferably a dodecane dicarboxylic acid because the density of the ester bond moiety in the polymer increases, the intermolecular force increase and folding is promoted from this.

In order to reduce blooming, the weight-average-molecular weight of the crystalline polyester C is preferably 15,000 to 300,000, and more preferably 15,000 to 50,000.

A sum of the acid value and the hydroxyl value of the crystalline polyester C is preferably 0.1 mg to 5.0 mg KOH/g in consideration of crystallization.

The crystalline polyester C can be produced according to a general polyester synthesis method. For example, the above carboxylic acid monomers and alcohol monomers are subjected to an esterification reaction or a transesterification reaction, and then subjected to a polycondensation reaction according to a general method under a reduced pressure or by introducing nitrogen gas, and thereby a crystalline polyester C can be obtained. Then, a desired crystalline polyester C can be obtained by additionally adding the above aliphatic compound and performing an esterification reaction.

The esterification or transesterification reaction can be performed using a general esterification catalyst or transesterification catalyst such as sulfuric acid, titanium butoxide, dibutyltin oxide, manganese acetate, or magnesium acetate as necessary.

In addition, the polycondensation reaction can be performed using a general polymerization catalyst, for example, a known catalyst such as titanium butoxide, dibutyltin oxide, tin acetate, zinc acetate, tin disulfide, antimony trioxide, or germanium dioxide. The polymerization temperature and the amount of the catalyst are not particularly limited and may be appropriately determined.

In the esterification or transesterification reaction or polycondensation reaction, methods in which, in order to increase the strength of the crystalline polyester C to be obtained, all of the monomers are added together and in order to reduce the amount of low-molecular-weight components, divalent monomers are reacted first, and monomers of trivalent or higher are then added and reacted may be used.

Wax

The toner particle comprises a wax. Examples of waxes include the following waxes.

Hydrocarbon-based waxes such as a low-molecular-weight polyethylene, low-molecular-weight polypropylene, alkylene copolymers, microcrystalline wax, paraffin wax, and Fischer-Tropsch wax; oxides of hydrocarbon-based wax such as oxidized polyethylene wax or block copolymers thereof; waxes mainly composed of fatty acid esters such as carnauba wax; and partially or completely deoxidized fatty acid esters such as deoxidized carnauba wax. Saturated straight-chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohol, behenyl alcohol, carnauba alcohol, ceryl alcohol, and myricyl alcohol; polyhydric alcohols such as sorbitol; esters of fatty acids such as palmitic acid, stearic acid, behenic acid, and montanic acid and alcohols such as stearyl alcohol, aralkyl alcohol, behenyl alcohol, carnauba alcohol, ceryl alcohol, and myricyl alcohol; fatty acid amides such as linoleic acid amide, oleic acid amide, and lauric acid amide; saturated fatty acid bisamides such as methylenebis stearic acid amide, ethylenebiscapric acid amide, ethylenebislauric acid amide, and hexamethylenebis stearic acid amide; unsaturated fatty acid amides such as ethylenebisoleic acid amide, hexamethylenebisoleic acid amide, N,N'-dioleyladipic acid amide, and N,N'-dioleylsebacic acid amide; aromatic bisamides such as m-xylene bisstearic acid amide, and N,N' distearyl isophthalic acid amide; fatty acid metal salts (generally called metal soap) such as calcium stearate, calcium laurate, stearic acidzinc, and magnesium stearate; waxes obtained by grafting vinyl monomers such as styrene and acrylic acid to aliphatic hydrocarbon-based waxes; partially esterified products of fatty acids and polyhydric alcohols such as behenic acid monoglyceride; and methyl ester compounds having a hydroxyl group obtained by hydrogenation of vegetable oils and fats.

Among these waxes, hydrocarbon waxes such as a paraffin wax and Fischer-Tropsch wax are preferable in consideration of reducing blooming. That is, the wax preferably comprises a hydrocarbon wax. The wax is more preferably a Fischer-Tropsch wax.

In order to reduce blooming, the content of the wax with respect to 100 parts by mass of the binder resin is preferably 2 to 10 parts by mass, and more preferably 3 to 8 parts by mass.

The melting point of the wax is preferably from 60 to 120° C. and more preferably from 90 to 110° C.

Colorant

The toner particle may comprise a colorant as necessary. Examples of the colorant include the following. Examples of black colorant include carbon black and those colored black using a yellow colorant, a magenta colorant, and a cyan colorant. As the colorant, a pigment may be used alone or a dye and a pigment may be used in combination. In consideration of image quality of full color images, it is preferable to use a dye and a pigment in combination.

Pigments for magenta toners can be exemplified by the following: C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C. I. Pigment Violet 19; and C. I. Vat Red 1, 2, 10, 13, 15, 23, 29, and 35.

Dyes for magenta toners can be exemplified by the following: oil-soluble dyes such as C. I. Solvent Red 1, 3, 8, 23, 24, 25, 27, 30, 49, 81, 82, 83, 84, 100, 109, and 121; C. I. Disperse Red 9; C. I. Solvent Violet 8, 13, 14, 21, and 27; and C. I. Disperse Violet 1, and basic dyes such as C. I. Basic Red 1, 2, 9, 12, 13, 14, 15, 17, 18, 22, 23, 24, 27, 29, 32, 34, 35, 36, 37, 38, 39, and 40 and C. I. Basic Violet 1, 3, 7, 10, 14, 15, 21, 25, 26, 27, and 28.

Pigments for cyan toners can be exemplified by the following: C. I. Pigment Blue 2, 3, 15:2, 15:3, 15:4, 16, and 17; C. I. Vat Blue 6; C. I. Acid Blue 45; and copper phthalocyanine pigments having at least 1 and not more than 5 phthalimidomethyl groups substituted on the phthalocyanine skeleton. C. I. Solvent Blue 70 is an example of a dye for cyan toners.

Pigments for yellow toners can be exemplified by the following: C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185 and by C. I. Vat Yellow 1, 3, and 20. C. I. Solvent Yellow 162 is an example of a dye for yellow toners.

A single one of these colorants may be used or a mixture may be used and these colorants may also be used in a solid solution state. The colorant is selected in consideration of the hue angle, chroma, lightness, lightfastness, OHP transparency, and dispersibility in toner particles.

The amount of the colorant is preferably from 0.1 to 30.0 parts by mass with respect to 100.0 parts by mass of the binder resin.

Charge Control Agent

The toner particle may contain a charge control agent as necessary. When the charge control agent is added, it is possible to stabilize charge properties, and it is possible to control the optimal triboelectric charge quantity according to a developing system. As the charge control agent, known agents can be used, and particularly, a metal compound of an aromatic carboxylic acid is preferable because it is colorless, has a high toner charging speed, and can stably maintain a constant charge quantity.

Examples of negative charge control agents include salicylate metal compounds, naphthoate metal compounds, dicarboxylic acid metal compounds, polymer type compounds having sulfonic acid or carboxylic acid in the side chain, polymer type compounds having sulfonate or sulfonate ester in the side chain, polymer type compounds having carboxylate or carboxylate ester in the side chain, boron compounds, urea compounds, silicon compounds, and calixarene.

The charge control agent may be internally added or externally added to the toner particle. The content of the charge control agent with respect to 100 parts by mass of the binder resin is preferably 0.2 to 10.0 parts by mass and more preferably 0.5 to 10.0 parts by mass.

Inorganic Fine Particle

The toner may contain an inorganic fine particle as necessary in addition to the above silica fine particle. The inorganic fine particle may be internally added to the toner particle or may be mixed with the toner as an external additive. Examples of inorganic fine particles include fine particles such as silica fine particles, titanium oxide fine particles, alumina fine particles and complex oxide fine particles thereof. Among the inorganic fine particles, silica fine particles and titanium oxide fine particles are preferable in order to improve the flowability and uniformize charging. The inorganic fine particles are preferably hydrophobized with a hydrophobic agent such as a silane compound, a silicone oil or a mixture thereof.

In order to improve flowability, the inorganic fine particle as an external additive preferably has a specific surface area of 50 to 400 m$^2$/g. In addition, in order to improve durable stability, the inorganic fine particle as an external additive preferably has a specific surface area of 10 to 50 m$^2$/g. In order to improve both flowability and durable stability, inorganic fine particles having a specific surface area within the above range may be used in combination.

The content of the external additive containing the silica fine particle described above with respect to 100 parts by mass of the toner particle is preferably 0.1 to 10.0 parts by mass. A known mixer such as a Henschel mixer can be used to mix the toner particle and the external additive.

The content of the silica fine particle with respect to 100 parts by mass of the toner particle is preferably 2.0 to 8.0 parts by mass and more preferably 3.0 to 5.0 parts by mass.

The content of the external additive other than the silica fine particle with respect to 100 parts by mass of the toner particle is preferably 0.1 to 5.0 parts by mass and more preferably 0.5 to 2.0 parts by mass.

Developer

The toner can be used as a one-component developer, and in order to further improve dot reproducibility and in order to supply stable images over a long time, it is preferably mixed with a magnetic carrier and used as a two-component developer.

The toner is preferably a toner for use in a two-component developer. The two-component developer comprises a toner and a magnetic carrier, and the toner is preferably the toner described above.

Examples of the magnetic carrier include generally known magnetic carriers such as magnetic bodies such as iron oxide, metal particles such as iron, lithium, calcium, magnesium, nickel, copper, zinc, cobalt, manganese, chromium, and rare earth, particles of alloys thereof, oxide particles, ferrites, etc., and magnetic body-dispersed resin carriers (the so-called resin carriers) including magnetic bodies and a binder resin in which the magnetic bodies are held in a dispersed state.

When the toner is mixed with a magnetic carrier and used as a two-component developer, the mixing ratio of the magnetic carrier at that time is preferably 2 to 15 mass % and more preferably 4 to 13 mass % or less, as the toner concentration in the two-component developer.

Method of Producing Toner Particle

The method of producing a toner particle is not particularly limited, and known methods such as a pulverization method, a suspension polymerization method, a dissolution suspension method, an emulsion aggregation method, and a dispersion polymerization method can be used. Among these, the pulverization method is preferable in order to control the wax on the surface of the toner. That is, the toner particle is preferably a pulverized toner particle. Hereinafter, the toner producing procedure in the pulverization method will be described. The pulverization method includes, for example, a raw material mixing step in which a wax, a crystalline polyester C and an amorphous polyester A as binder resins and, as necessary, other components such as a colorant and a charge control agent are mixed, and a step in which the mixed raw material is melted and kneaded to obtain a resin composition, and a step in which the obtained resin composition is pulverized to obtain a toner particle.

In the raw material mixing step, for materials constituting the toner particle, for example, predetermined amounts of a binder resin, a wax, and as necessary, other components such as a colorant and a charge control agent, are weighed out and added and mixed. Examples of mixing devices include a double cone mixer, a V-type mixer, a drum type mixer, a super mixer, a Henschel mixer, Nauta Mixer, and Mechano Hybrid (commercially available from Nippon Coke & Engineering. Co., Ltd.).

Next, the mixed materials are melted and kneaded, and the materials are dispersed in the binder resin. In the melt-kneading step, a batch type kneading machine such as a pressure kneader and a Banbury mixer or a continuous type kneading machine can be used, and single-screw or twin-screw extruders are mainstream due to the superiority of continuous production. Examples thereof include KTK type twin-screw extruder (commercially available from Kobelco), TEM type twin-screw extruder (commercially available from Toshiba Machine Co., Ltd.), PCM kneader (commercially available from Ikegai), twin-screw extruder (commercially available from KGK Corporation), Ko-Kneader (commercially available from Buss Corporation), and KNEADEX (commercially available from Nippon Coke & Engineering. Co., Ltd.). In addition, the resin composition obtained by melt-kneading may be rolled with two rollers or the like and cooled with water or the like in the cooling step.

Then, the cooled product of the kneaded product can be pulverized to a desired particle diameter in the pulverization step. In the pulverization step, after coarse pulverization with a pulverizer such as a crusher, a hammer mill, or a feather mill, fine pulverization is further performed, for example, with Cryptron System (manufactured by Kawasaki Heavy Industries, Ltd.), Super Rotor (manufactured by Nisshin Engineering Co., Ltd.), a turbo mill (manufactured by Turbo Industry Co., Ltd.), or a fine pulverizer based on an air jet method.

After that, if necessary, classification is performed with a classifier or a sieving machine such as Elbow Jet of an inertial classification system (manufactured by Nittetsu Mining Co., Ltd.), Turboplex of a centrifugal force classification system (manufactured by Hosokawa Micron Corporation), a TSP separator (manufactured by Hosokawa Micron Corporation), and Faculty (manufactured by Hosokawa Micron Corporation) to obtain toner particles.

Then, in order to appropriately cover the surface of the toner particle with a wax, the surface of the toner particle is preferably treated by heating to reduce blooming. For example, the surface treatment can be performed with hot air using a surface treatment device shown in the FIGURE.

Hereinafter, the surface treatment using the surface treatment device shown in the FIGURE will be described.

Reference numerals in the FIGURE are as follows.

1. raw material constant supply unit, 2. compressed gas flow rate adjusting unit, 3. inlet tube, 4. protruding member, 5. supply pipe, 6. treatment chamber, 7. hot air supply unit, 8. cool air supply unit, 9. regulating unit, 10. collecting unit, 11. hot air supply unit outlet, 12. distribution member, 13. revolving member, 14. powder particle supply port The mixture quantitatively supplied from the raw material constant supply unit 1 is guided to the inlet tube 3 installed on the vertical line of a raw material supply unit with a compressed gas adjusted by the compressed gas flow rate adjusting unit 2. The mixture that has passed through the inlet tube is uniformly dispersed by the conical protruding member 4 provided in the center part of the raw material supply unit, and is led to the supply pipe 5 radially extended in 8 directions and led to the treatment chamber 6 in which a heat treatment is performed.

In this case, the flow of the mixture supplied to the treatment chamber 6 is regulated by the regulating unit 9 for regulating the flow of the mixture provided in the treatment chamber 6. Therefore, the mixture supplied to the treatment chamber is heated while swirling in the treatment chamber 6 and then cooled.

Hot air for heating the supplied mixture is supplied from the hot air supply unit 7 and hot air in the treatment chamber 6 is spirally swirled and introduced by the revolving member 13 for swirling hot air. Regarding the configuration, the revolving member 13 for swirling hot air has a plurality of blades, and swirling of hot air can be controlled according to the number and angle of blades.

The hot air supplied into the treatment chamber 6 preferably has a temperature of 100 to 300° C. at the outlet of the hot air supply unit 7. When the temperature at the outlet of the hot air supply unit is within the above range, it is possible to uniformly spheroidize the toner particle while preventing the toner particle from fusing or coalescing due to excessive heating of the mixture.

In addition, the heat-treated toner particle that has been heated is cooled with cool air supplied from the cool air supply unit 8. The temperature of the cool air supplied from the cool air supply unit 8 is preferably −20 to 30° C. When the temperature of the cool air is within the above range, the heat-treated toner particle can be efficiently cooled, and fusion and coalescence of the heat-treated toner particle can be prevented without inhibiting the uniform sphering treatment of the mixture. The absolute water content of the cool air is preferably from 0.5 to 15.0 $g/m^3$.

Next, the cooled heat-treated toner particles are collected by the collecting unit 10 at the lower end of the treatment chamber 6. Here, a blower (not shown) is provided at the end of the collecting unit 10, and is configured to perform sucking and transporting.

In addition, the powder particle supply port 14 is provided so that the swirling direction of the supplied mixture and the swirling direction of the hot air are the same, and the collecting unit 10 of the surface treatment device is provided at the outer periphery of the treatment chamber 6 so that the swirling direction of the swirled powder particle is maintained. In addition, the cool air supplied from the cool air supply unit 8 is set to be supplied from the outer periphery of the device to the inner peripheral surface of the treatment chamber in a horizontal and tangential direction.

The swirling direction of the toner particle supplied from the powder feeding port, the swirling direction of the cool air supplied from the cool air supply unit 8, and the swirling direction of the hot air supplied from the hot air supply unit 7 are all the same direction. Therefore, no turbulent flow occurs in the treatment chamber 6, the swirling flow in the device is strengthened, a strong centrifugal force is applied to the toner particle, the dispersibility of the toner particle is further improved and thus it is possible to obtain toner particles with a uniform shape with few coalesced particles.

When the average circularity of the toner is from 0.950 to 0.980, the surface of the toner particle can be appropriately covered with a wax.

Then, an external additive such as the silica fine particle is externally added to the surface of the toner particle to obtain a toner. Examples of methods of externally adding an external additive include a method in which predetermined amounts of the classified toner and various known external additives are added and stirred and mixed using a mixing device such as a double cone mixer, a V-type mixer, a drum type mixer, a super mixer, a Henschel mixer, a Nauta Mixer, a Mechano Hybrid (commercially available from Nippon Coke & Engineering. Co., Ltd.), or Nobilta (commercially available from Hosokawa Micron Corporation) as an external addition device.

The method of measuring various physical properties will be described below.

Method of Separating Each Material from Toner

Each material can be separated from the toner using the difference in solubility of each material contained in the toner in a solvent.

First separation: the toner is dissolved in methyl ethyl ketone (MEK) at 23° C. to separate soluble components (an amorphous polyester A) and insoluble components (a crystalline polyester C, a wax, a colorant, an inorganic fine particle, etc.).

Second separation: the insoluble components (a crystalline polyester C, a wax, a colorant, an inorganic fine particle, etc.) obtained in the first separation are dissolved in MEK at 100° C., and soluble components (a crystalline polyester C and a wax) and insoluble components (a colorant, an inorganic fine particle, etc.) are separated.

Third separation: the soluble components (crystalline polyester C, wax) obtained in the second separation are dissolved in chloroform at 23° C., and soluble components (a crystalline polyester C) and insoluble components (a wax) are separated.

Measurement of Content $W_C$ of Crystalline Polyester C Based on Mass of Toner

The crystalline polyester C is collected using the above separation method, and the content is determined.

Method of Measuring Content of Monomer Units of Various Polymerizable Monomers in Amorphous Polyester A and Crystalline Polyester C The content of monomer units of various polymerizable monomers in the amorphous polyester A and the crystalline polyester C is measured through $^1$H-NMR under the following conditions.

Measurement device: FT NMR device JNM-EX400 (commercially available from JEOL Ltd.)
Measurement frequency: 400 MHz
Pulse condition: 5.0 μs
Frequency range: 10,500 Hz
Cumulative number of measurements: 64
Measurement temperature: 30° C.
Sample: 50 mg of a measurement sample is put into a sample tube having an inner diameter of 5 mm, deuterated chloroform (CDCl$_3$) as a solvent is added, and the mixture is dissolved in a thermostatic tank at 40° C. for preparation.

Using the obtained $^1$H-NMR chart, the integrated values $S_1, S_2, S_3, \ldots S_n$ of the peaks belonging to elements constituting monomer units of various polymerizable monomers are calculated.

The content of monomer units of various polymerizable monomers is obtained as follows using the integrated values $S_1, S_2, S_3$ and $S_n$. Here, $n_1, n_2, n_3 \ldots n_n$ are the number of hydrogen atoms in constituent elements to which the focused peaks for respective parts belong.

Content of monomer units of various polymerizable monomers(mol %)=$\{(S_n/n_n)/((S_1/n_1)+(S_2/n_2)+(S_3/n_3) \ldots +(S_n/n_n))\} \times 100$ By changing the numerator term in the same operation, the amount of monomer units of various polymerizable monomers is calculated. Here, when a polymerizable monomer that does not contain a hydrogen atom is used in the monomer units of various polymerizable monomers, the atom nucleus to be measured is set to $^{13}$C using $^{13}$C-NMR, measurement is performed in a single pulse mode, and calculation is performed in the same manner as with $^1$H-NMR.

Method of Calculating SP Value

The $SP_A$ value of the amorphous polyester A, and the $SP_{A1}, SP_{A2}, SP_{A3}$, and $SP_{An}$ values of monomer units of respective polymerizable monomers of the amorphous polyester A, the $SP_C$ value of the crystalline polyester C, and the $SP_{C1}, SP_{C2}, SP_{C3}$, and $SP_{Cn}$ values of monomer units of respective polymerizable monomers of the crystalline polyester C are obtained as follows according to the calculation method proposed by Fedors.

Regarding the monomer units of respective polymerizable monomers, for the atom or atom group in the molecular structure, the evaporation energy (Δei) (cal/mol) and the molar volume (Δvi) (cm$^3$/mol) are obtained from the table described in "Polym. Eng. Sci., 14(2), 147-154 (1974)" and $(\Sigma\Delta ei/\Sigma\Delta vi)^{0.5}$ is defined as the SP value (cal/cm$^3$)$^{0.5}$.

$SP_A$ and $SP_C$ are calculated as follows. First, the evaporation energy (Δei) and the molar volume (Δvi) of monomer units of constituent polymerizable monomers are obtained for each monomer unit, and the product of the molar ratio (j) of respective monomer units in the amorphous polyester A and the crystalline polyester C is calculated. Then, the sum of evaporation energies and the sum of molar volumes of respective monomer units are assigned to the following formula, and respective SP values are calculated.

$$SP \text{ value}=\{(\Sigma j \times \Sigma \Delta ei)/(\Sigma j \times \Sigma \Delta vi)\}^{0.5}$$

Measurement of Weight-Average-Molecular Weight of Crystalline Polyester C Through GPC The molecular weight (Mw) of the toluene-soluble component of the crystalline polyester C at 100° C. is measured as follows through gel permeation chromatography (GPC).

First, the crystalline polyester C is dissolved in toluene at 100° C. for 1 hour. Then, the obtained solution is filtered through a solvent-resistant membrane filter having a pore diameter of 0.2 μm ("Mysyori Disk" commercially available from Tosoh Corporation) to obtain a sample solution. Here, the sample solution is adjusted so that the concentration of the toluene-soluble component is about 0.1 mass %. Measurement is performed using the sample solution under the following conditions.

Device: HLC-8121GPC/HT (commercially available from Tosoh Corporation)
Column: TSKgel GMHHR-H HT (7.8 cm I. D×30 cm) two columns (commercially available from Tosoh Corporation)
Detector: RI for high temperature
Temperature: 135° C.
Solvent: toluene
Flow rate: 1.0 mL/min
Sample: inject 0.4 mL of 0.1% sample A molecular weight calibration curve prepared from a monodisperse polystyrene standard sample is used to calculate the molecular weight of the sample. In addition, it is calculated by performing conversion to polyethylene according to a conversion formula derived from the Mark-Houwink viscosity formula.

Measurement of Melting Peak Temperature (Melting Point) of Crystalline Polyester C, etc.

The melting point ($T_C$) of the crystalline polyester C and the melting point of the wax are measured according to ASTM D3418-82 using a differential scanning calorimetry analyzer "Q2000" (commercially available from TA Instruments).

The temperature of the device detector is corrected using the melting points of indium and zinc, and heat of fusion of indium is used to correct the amount of heat. Specifically, 3 mg of the sample is accurately weighed out, put into an aluminum pan, and measured under the following conditions using an empty aluminum pan as a reference.

Ramp rate: 10° C./min
Measurement start temperature: 30° C.
Measurement end temperature: 180° C.

Measurement is performed in a measurement range of 30 to 180° C. at a ramp rate of 10° C./min. The temperature is once raised to 180° C. and the sample is held for 10 minutes, the temperature is then lowered to 30° C., and the temperature is then raised again. The melting point is a temperature at which the endothermic peak of a temperature-endothermic curve is a maximum in a range of 30 to 100° C. in the second heating procedure.

Measurement of Average Coverage Sb and Average Coverage Sa

The average coverage Sb and the average coverage Sa of the surface of the toner with silica fine particles can be obtained by observing a secondary electron image under a scanning electron microscope (SEM) and performing subsequent image processing.

The average coverage Sb and the average coverage Sa of the surface of the toner with silica fine particles are measured using a scanning electron microscope (SEM), S-4800 (commercially available from Hitachi, Ltd.). An area proportion of a portion corresponding to silica fine particles is calculated based on image processing on mainly a high-brightness portion at an accelerating voltage of 2.0 kV.

Specifically, the toner is fixed in a single layer on a sample table for electronic microscope observation with a carbon tape (commercially available from Nisshin-EM), vapor deposition with platinum is performed, and observation is performed under a scanning electron microscope S-4800 (commercially available from Hitachi, Ltd.) under the following conditions. Observation is performed after a flushing operation is performed.

SignalName=SE(U, LA80)
AcceleratingVoltage=2,000 Volt
EmissionCurrent=10,000 nA
WorkingDistance=6,000 um
LensMode=High
Condencer1=5
ScanSpeed=Slow4 (40 seconds)
Magnification=50,000
DataSize=1,280×960
ColorMode=Grayscale For the secondary electron image, on control software of the scanning electron microscope S-4800, the brightness is adjusted to 'contrast 5, brightness-5', the capture speed/cumulative number 'Slow4 is set to 40 seconds', and a projection image of the toner is obtained as an 8-bit 256-gradation grayscale image with an image size of 1,280×960 pixels. From the scale on the image, the length of 1 pixel is 0.02 μm, and the area of 1 pixel is 0.0004 μm².

Subsequently, using the obtained projection image with the secondary electron, for 100 toner particles, the area proportion (area %) of the portion corresponding to the toner particles and the silica fine particles is calculated. The method of selecting 100 toner particles to be analyzed will be described below in detail. The area % of the portion corresponding to silica fine particles is calculated using image processing software Image-Pro Plus5.1J (commercially available from Media Cybernetics, Inc.).

Specifically, a portion of a toner particle group is extracted and the size of one extracted toner particle is counted. Specifically, first, in order to extract the toner particle group to be analyzed, the toner particle group and the background portion are separated. "Measurement"–"count/size" of Image-Pro Plus5.1J is selected. In the "brightness range selection" of "count/size," the brightness range is set in a range of 50 to 255, a carbon tape portion with low brightness captured as a background is excluded, and the toner particle group is extracted.

When the toner particle group is fixed by a method other than the carbon tape, the background does not always have a low brightness or there is a possibility of the brightness becoming partially the same as that of the toner particle group. However, the boundary between the toner particle group and the background can be easily distinguished from the secondary electron observation image.

When extraction is performed, in the "count/size" extraction option, 4 connections are selected, a smoothness of 5 is input, "fill holes," are checked and the toner positioned on the entire boundary (outer circumference) of the image and the toner overlapping other toners are excluded from calculation. Next, in the "count/size" measurement item, select the area and the Feret's diameter (average), set the area selection range to a minimum of 100 pixels and a maximum of 10,000 pixels, and extract respective toner particles to be image-analyzed. One toner particle is selected from the extracted toner particle group, and the size (the number of pixels) of the portion corresponding to the particle is defined as (j a).

Next, in "brightness range selection" of "count/size" of Image-Pro Plus5.1J, the brightness range is set in a range of 140 to 255, and a high brightness portion on one toner particle is extracted. A large-particle-size silica having high brightness and a maximum diameter of primary particle of 80 to 135 nm is selected, and for the toner selected when ja is determined, the size (the number of pixels) of the portion corresponding to the silica fine particles on the surface of the toner is defined as (ma).

In each one toner particle, the extracted portion derived from the silica fine particle is scattered with a certain size, and ma is the total area of one particle. Using the following formula from the obtained ma, the coverage $s_1$ with silica fine particles is obtained.

$$s_1 = (ma/ja) \times 100$$

Next, each particle of the extracted particle group is subjected to the same treatment until 100 toners are selected. When the number of toners in one field of view is less than 100, the same operation is repeated for a toner projection image in another field of view.

In addition, the arithmetic average value of the coverage $s_1$ of the surface of 100 toners with silica fine particles is the average coverage Sb (area %) of the surface of the toner with silica fine particles.

In addition, the same operation is performed on the toner treated with hexane by the following method, and the average coverage Sa (area %) of the surface of the toner after the hexane treatment with silica fine particles is obtained.

Hexane Treatment Method 1 g of the toner is dispersed in 20 m¹ of hexane with ultrasonic waves for 5 minutes and then sucked and filtered, and only the toner is taken out and draft-dried for 1 day.

Measurement of Diffraction Peak of Crystalline Polyester C

For the diffraction peak of the crystalline polyester C, a powder X-ray diffractometer (XRD) "SmartLab" (sample horizontal high-intensity X-ray diffractometer, commercially available from Rigaku Corporation) is used. In addition, analysis software "PDXL2 (version2.2.2.0)" bundled into the device is used for calculation of the obtained peak. As a measurement sample, a toner or a product obtained by isolating the crystalline polyester C from the toner is used and measured by the following procedure.

Preparation of Sample

The measurement sample is placed uniformly in a Boro-Silicate capillary (commercially available from W. Muller) with a diameter of 0.5 mm and then measured.

Measurement Conditions
- Tube bulb: Cu
- Optical system: CBO-E
- Sample table: capillary sample table
- Detector: D/tex Ultra250 detector
- Voltage: 45 kV
- Current: 200 mA
- Start angle: 10°
- End angle: 90°
- Sampling width: 0.02°
- Speed measurement time set value: 10
- IS: 1 mm
- RS1: 20 mm
- RS2: 20 mm
- Attenuator: Open
- Capillary rotation speed set value: 100

First, the temperature is raised from 25° C. to 100° C. at a 100° C./min, and the sample is held for 5 min and then lowered to 25° C. at a rate of 1° C./min. In this case, the XRD spectrum at each temperature can be obtained by performing measurement every 1 min.

Analysis

First, the obtained peaks are subjected to peak separation processing using software "PDXL2" bundled into the device. Peak separation is achieved by performing optimization using a "split type Voigt function" that can be selected in PDXL according to the wax-specific peak and the crystalline polyester-specific peak, and the obtained integrated intensity value is used.

The integrated intensity $C_C$ of the crystal structure of the crystalline polyester C when the crystalline polyester C is used as a measurement sample is the integrated intensity in a range of 2θ of 23° to 25°.

In addition, the integrated intensity $C_T$ of the crystal structure of the crystalline polyester C when the toner is used as a measurement sample is the integrated intensity in a range of 2θ of 23° to 25°.

Here, whether the obtained peak is a peak corresponding to the crystalline polyester C is confirmed by confirming that the same peak as in the crystalline polyester C obtained from the method of separating each of the above materials is obtained.

Method for Measuring Softening Points $T_A$ and $T_M$

The softening points $T_A$ and $T_M$ are measured using a constant-load extrusion type capillary rheometer "Flow Tester CFT-500D" (manufactured by Shimadzu Corporation) according to the manual provided with the device. In this device, while applying a constant-load from the top of the measurement sample with a piston, the temperature of the measurement sample filled in a cylinder is raised, the sample is melted, the melted measurement sample is pushed out from a die at the bottom of the cylinder, and a flow curve showing the relationship between the piston descent amount and temperature at this time can be obtained.

The softening point is the "melting temperature in the ½ method" described in the manual provided with the "flow characteristic evaluation device Flow Tester CFT-500D". The melting temperature in the ½ method is calculated in the following manner. First, ½ of the difference between the piston descent amount Smax at the time when the outflow ends and the piston descent amount Smin at the time when the outflow starts is obtained (this is denoted by X. X=(Smax−Smin)/2). The temperature at the flow curve when the piston descent amount in the flow curve is the sum of X and Smin is the melting temperature in the ½ method.

A columnar measurement sample with a diameter of about 8 mm is prepared by compression molding about 1.9 g of the resin at about 10 MPa for about 60 sec by using a tablet molding compressor (for example, NT-100H, manufactured by NPA System Co., Ltd.) in an environment of 25° C.

Specific operations in the measurement are performed according to the manual bundled in the device.

The measurement conditions of CFT-500D are as follows.
- Test mode: heating method
- Starting temperature: 50° C.
- Reached temperature: 200° C.
- Measurement interval: 1.0° C.
- Temperature rise rate: 4.0° C./min
- Piston cross-sectional area: 1.000 cm$^2$
- Test load (piston load): 10.0 kgf/cm$^2$ (0.9807 MPa)
- Preheating time: 300 sec
- Die hole diameter: 1.0 mm
- Die length: 1.0 mm Measurement of $T_M$ The mass ratio of the amorphous polyester A and the crystalline polyester C in the toner is calculated from the masses of respective materials obtained by separating respective above materials. A mixture of the amorphous polyester A and the crystalline polyester C separated from the toner by the above procedure at a calculated mass ratio is used as a sample, and the softening point $T_M$ is obtained.

Method of Calculating $A_{W1}$, $A_{C1}$, and $A_{C2}$

The FT-IR spectrum is measured using a Fourier transform infrared spectrometer (Spectrum One: commercially available from PerkinElmer Co., Ltd.) with a universal ATR measurement accessory (Universal ATR Sampling Accessory) according to the ATR method. Specific measurement procedures are as follows.

The angle of incidence of infrared light (λ=5 μm) is set to 45°. As the ATR crystal, a Ge ATR crystal (refractive index=4.0) is used. Other conditions are as follows.

Range
- Start: 4,000 cm$^{-1}$
- End: 600 cm$^{-1}$ (ATR crystal of Ge)

Duration
- Scan number: 16
- Resolution: 4.00 cm$^{-1}$
- Advanced: with $CO_2/H_2O$ correction Measurement Procedure
(1) A Ge ATR crystal (refractive index=4.0) is mounted on a device.
(2) Scan type is set to Background, Units is set to EGY, and the background is measured.
(3) Scan type is set to Sample, and Units is set to A.
(4) 0.01 g of the toner, the amorphous polyester A separated from the toner or the crystalline polyester C separated from the toner is accurately weighed out on the ATR crystal.
(5) The sample is pressurized with a pressure arm (Force Gauge is 90).
(6) The sample is measured.

(7) The obtained FT-IR spectrum is subjected to baseline correction according to Automatic Correction.

Analysis

When the amorphous polyester A is used as a sample
(1) The maximum value (A1) of the absorption peak (benzene ring) intensity at 1,508 cm$^{-1}$ is calculated.
(2) The maximum value (A2) of the absorption peak (carbonyl) intensity at 1,719 cm$^{-1}$ is calculated.
(3) The maximum value (A2') of the absorption peak (carbonyl) intensity at 1,738 cm$^{-1}$ is calculated.

When the toner is used as a sample
(1) The maximum value (T1) of the absorption peak (benzene ring) intensity at 1,508 cm$^{-1}$ is calculated.
(2) The maximum value (T2) of the absorption peak (carbonyl) intensity at 1,719 cm$^{-1}$ is calculated.
(3) The maximum value (T2') of the absorption peak (carbonyl) intensity at 1,738 cm$^{-1}$ is calculated.
(4) The maximum value (T3) of the absorption peak (—CH$_2$—) intensity at 2,849 cm$^{-1}$ is calculated.

When the crystalline polyester C is used as a sample
(1) The maximum value (C2') of the absorption peak (carbonyl) intensity at 1,738 cm$^{-1}$ is calculated.
(2) The maximum value (C3) of the absorption peak (—CH$_2$—) intensity at 2,849 cm$^{-1}$ is calculated.

According to T2(A)=T1×A2/A1, a carbonyl peak component at 1,719 cm$^{-1}$ derived from the amorphous polyester A in the toner is calculated.

According to T2'(A)=T1×A2'/A1, a carbonyl peak component at 1,738 cm$^{-1}$ derived from the amorphous polyester A in the toner is calculated.

According to T2'(C)=T2'−T2'(A), a carbonyl peak component at 1,738 cm$^{-1}$ derived from the crystalline polyester C in the toner is calculated.

According to T3(C)=T2'(C)×C3/C2', a (—CH$_2$—) peak component derived from the crystalline polyester C in the toner is calculated.

According to T3(W)=T3−T3(C), a (—CH$_2$—) peak component derived from the wax in the toner is calculated.

Here, $A_{W1}$ and $A_{C1}$ can be calculated using the following formula.

Wax index $A_{W1}=T3(W)/T2(A)$

Crystalline polyester index $A_{C1}=T3(C)/T2(A)$

Therefore, $A_{W1}$ is a value indicating the degree of the (—CH$_2$—) peak component derived from the wax relative to the carbonyl peak component at 1,719 cm$^{-1}$ derived from the amorphous polyester A in the toner. $A_{C1}$ is a value indicating the degree of the (—CH$_2$—) peak component derived from the crystalline polyester relative to the carbonyl peak component at 1,719 cm$^{-1}$ derived from the amorphous polyester A in the toner.

In addition, the value calculated in the same manner as in the above $A_{C1}$ using the toner stored in a vacuum dryer at 50° C. in a vacuum for 5 days is defined as a crystalline polyester index (after vacuum storage) $A_{C2}$.

EXAMPLES

Hereinafter, the present invention will be described in more detail with reference to examples, but these are not intended to limit the present invention. Here, in the following examples, unless otherwise specified, parts are based on mass.

Production Example of Crystalline Polyester C1 ethylene glycol: 28.0 parts (49.9 mol %)
dodecanedioic acid: 72.0 parts (50.1 mol %)
titanium tetrabutoxide (esterification catalyst): 0.5 parts The above materials were weighed into a reaction tank including a cooling tube, a stirrer, a nitrogen inlet tube, and a thermocouple. Next, the inside of the flask was purged with nitrogen gas, the temperature was then gradually raised while stirring, and the sample was reacted for 2 hours while stirring at a temperature of 200° C.

In addition, the pressure in the reaction tank was lowered to 8.3 kPa, the sample was reacted for 5 hours while the temperature was maintained at 200° C., the temperature was then lowered to stop the reaction, and thereby a crystalline polyester C1 was obtained. The obtained crystalline polyester C1 had a weight-average-molecular weight Mw of 180,000 and a melting point $T_C$ of 90.0° C.

When the crystalline polyester C1 was analyzed through XRD, the integrated intensity $C_C$ of the crystal structure was 40,000 cps.

When the crystalline polyester C1 was analyzed through NMR, it contained 49.9 mol % of the ethylene glycol monomer unit and 50.1 mol % of the dodecanedioic acid monomer unit. The SP value of the monomer unit of the linear aliphatic polyhydric alcohol c1, the monomer unit of the linear aliphatic polycarboxylic acid c2 and the crystalline polyester C1 was calculated by the above method, and the SP value $SP_C$ of the crystalline polyester C1 was 10.0 (cal/cm$^3$)$^{0.5}$.

Production Example of Crystalline Polyesters C2 to C16

Crystalline polyesters C2 to C$_{16}$ were obtained in the same reaction as in the production example of the crystalline polyester C1 except that respective polymerizable monomers and the number of parts were changed as shown in Table 1, and the reaction time was changed as shown in Table 3. The physical properties of the crystalline polyesters C2 to C16 are shown in Table 2 and Table 3.

TABLE 1

| Crystalline | Linear aliphatic polyhydric alcohol c1 | | | Linear aliphatic polycarboxylic acid c2 | | |
|---|---|---|---|---|---|---|
| polyester C | Type | Parts | mol [%] | Type | Parts | mol [%] |
| 1 | ED | 28.0 | 49.9 | DDA | 72.0 | 50.1 |
| 2 | ED | 28.0 | 49.9 | DDA | 72.0 | 50.1 |
| 3 | ED | 28.0 | 49.9 | DDA | 72.0 | 50.1 |
| 4 | ED | 28.0 | 49.9 | DDA | 72.0 | 50.1 |
| 5 | ED | 28.0 | 49.9 | DDA | 72.0 | 50.1 |
| 6 | ED | 28.0 | 49.9 | DDA | 72.0 | 50.1 |
| 7 | ED | 28.0 | 49.9 | DDA | 72.0 | 50.1 |
| 8 | ED | 32.0 | 50.5 | DA | 68.0 | 49.5 |
| 9 | ED | 33.0 | 49.3 | NA | 67.0 | 50.7 |
| 10 | HD | 35.0 | 50.3 | HDA | 65.0 | 49.8 |
| 11 | OD | 37.0 | 50.2 | ODA | 63.0 | 49.8 |
| 12 | ED | 36.0 | 50.0 | OA | 64.0 | 50.0 |
| 13 | ED | 39.0 | 50.3 | HA | 61.0 | 49.7 |

TABLE 1-continued

| Crystalline polyester C | Linear aliphatic polyhydric alcohol c1 | | | Linear aliphatic polycarboxylic acid c2 | | |
|---|---|---|---|---|---|---|
| | Type | Parts | mol [%] | Type | Parts | mol [%] |
| 14 | ED | 25.0 | 49.6 | TDA | 75.0 | 50.5 |
| 15 | ED | 23.0 | 49.9 | HDA | 77.0 | 50.1 |
| 16 | HD | 53.0 | 50.1 | HA | 47.0 | 49.9 |

Abbreviations in Table 1 to Table 3 are as follows.

ED: ethanediol (ethylene glycol) (2 carbon atoms)

HD: hexanediol (6 carbon atoms)

OD: octanediol (8 carbon atoms)

HA: hexanedioic acid (6 carbon atoms)

OA: octanedioic acid (8 carbon atoms)

NA: nonanedioic acid (9 carbon atoms)

DA: decanedioic acid (10 carbon atoms)

DDA: dodecanedioic acid (12 carbon atoms)

TDA: tetradecanedioic acid (14 carbon atoms)

HDA: hexadecanedioic acid (16 carbon atoms)

ODA: octadecanedioic acid (18 carbon atoms)

TABLE 2

| Crystalline polyester C | Monomer unit of linear aliphatic polyhydric alcohol c1 | | Monomer unit of linear aliphatic polycarboxylic acid c2 | | $SP_C$ |
|---|---|---|---|---|---|
| | Unit | $SP_{C1}$ | Unit | $SP_{C2}$ | |
| 1 | ED | 11.52 | DDA | 9.48 | 10.0 |
| 2 | ED | 11.52 | DDA | 9.48 | 10.0 |
| 3 | ED | 11.52 | DDA | 9.48 | 10.0 |
| 4 | ED | 11.52 | DDA | 9.48 | 10.0 |
| 5 | ED | 11.52 | DDA | 9.48 | 10.0 |
| 6 | ED | 11.52 | DDA | 9.48 | 10.0 |
| 7 | ED | 11.52 | DDA | 9.48 | 10.0 |
| 8 | ED | 11.52 | DA | 9.67 | 10.2 |
| 9 | ED | 11.52 | NA | 9.80 | 10.3 |
| 10 | HD | 9.97 | HDA | 9.25 | 9.5 |
| 11 | OD | 9.67 | ODA | 9.17 | 9.4 |
| 12 | ED | 11.52 | OA | 9.97 | 10.5 |
| 13 | ED | 9.35 | HA | 10.18 | 10.7 |
| 14 | ED | 11.52 | TDA | 9.35 | 9.8 |
| 15 | ED | 11.52 | HDA | 9.25 | 9.7 |
| 16 | HD | 9.97 | TA | 10.18 | 10.1 |

The unit of the SP value was $(cal/cm^3)^{0.5}$.

TABLE 3

| Crystalline polyester C | Reaction time [H] | Mw | Carbon number difference | Melting point [° C.] | Integrated intensity of crystal structure Cc [cps] |
|---|---|---|---|---|---|
| 1 | 5.0 | 18000 | 10 | 90 | 40000 |
| 2 | 4.5 | 15000 | 10 | 89 | 40000 |
| 3 | 4.0 | 10000 | 10 | 88 | 40000 |
| 4 | 3.8 | 8000 | 10 | 87 | 40000 |
| 5 | 3.5 | 5000 | 10 | 86 | 40000 |
| 6 | 6.0 | 25000 | 10 | 92 | 40000 |
| 7 | 6.5 | 27000 | 10 | 93 | 40000 |
| 8 | 5.0 | 18000 | 8 | 88 | 40000 |
| 9 | 5.0 | 18000 | 7 | 87 | 40000 |
| 10 | 5.0 | 18000 | 10 | 80 | 40000 |
| 11 | 5.0 | 18000 | 10 | 83 | 40000 |
| 12 | 5.0 | 18000 | 6 | 86 | 40000 |
| 13 | 5.0 | 18000 | 4 | 85 | 40000 |
| 14 | 5.0 | 18000 | 12 | 80 | 40000 |
| 15 | 5.0 | 18000 | 14 | 82 | 40000 |
| 16 | 5.0 | 18000 | 0 | 68 | 40000 |

The carbon number difference is a difference between the number of carbon atoms of the linear aliphatic polyhydric alcohol c1 and the number of carbon atoms of the linear aliphatic polycarboxylic acid c2.

Production Example of Amorphous Polyester A1 bisphenol A·PO (propylene oxide) adduct (an average addition mole number of 2.0): 40.0 parts (12.6 mol %)

ethylene glycol: 20.0 parts (39.8 mol %)

terephthalic acid: 40.0 parts (47.7 mol %)

titanium tetrabutoxide (esterification catalyst): 0.5 parts

The above materials were weighed into a reaction tank including a cooling tube, a stirrer, a nitrogen inlet tube, and a thermocouple. Next, the inside of the flask was purged with nitrogen gas, the temperature was then gradually raised while stirring, and the sample was reacted for 2 hours while stirring at a temperature of 200° C.

In addition, the pressure in the reaction tank was lowered to 8.3 kPa, the sample was reacted for 5 hours while the temperature was maintained at 200° C., and after it was confirmed that the softening point measured according to ASTM D36-86 reached a temperature of 115° C., the temperature was lowered to stop the reaction, and thereby an amorphous polyester A1 was obtained.

The amorphous polyester A1 was analyzed through NMR, and confirmed that it contained 12.6 mol % of the polyoxypropylene (2.0)-2,2-bis(4-hydroxyphenyl)propane monomer unit, 39.8 mol % of the ethylene glycol monomer unit, and 47.7 mol % of the terephthalic acid monomer unit. The SP value of the monomer unit of the linear aliphatic polyhydric alcohol a1, the monomer unit of the polymerizable monomer, and the amorphous polyester A was calculated by the above method, and $SP_A$ was 11.0 $(cal/cm^3)^{0.5}$.

The above amorphous polyester A1 was analyzed with a flow tester, and the softening point $T_A$ was 115.0° C.

Production Example of Amorphous Polyesters A2 and A3

Amorphous polyesters A2 and A3 were obtained in the same reaction as in the production example of the amorphous polyester A1 except that respective polymerizable monomers and the number of parts were changed as shown in Table 4. The physical properties are shown in Table 5.

TABLE 4

| Amorphous polyester A | Polymerizable monomer | | | Linear aliphatic polyhydric alcohol a1 | | | Polymerizable monomer | | |
|---|---|---|---|---|---|---|---|---|---|
| | Type | Parts | mol % | Type | Parts | mol % | Type | Parts | mol % |
| 1 | PO2 | 40.0 | 12.5 | ED | 20.0 | 39.8 | TPA | 40.0 | 47.7 |
| 2 | PO2 | 30.0 | 10.4 | HD | 30.0 | 37.0 | TPA | 40.0 | 52.6 |
| 3 | PO2 | 15.0 | 5.0 | OD | 45.0 | 44.1 | TPA | 40.0 | 50.9 |

Abbreviations in Table 4 to Table 5 are as follows.
PO2: bisphenol A·PO adduct (an average addition mole number of 2.0)
ED: ethanediol (ethylene glycol) (2 carbon atoms)
HD: hexanediol (6 carbon atoms)
OD: octanediol (8 carbon atoms)
TPA: terephthalic acid

TABLE 5

| Amorphous polyester A | Polymerizable monomer | | Linear aliphatic polyhydric alcohol a1 | | Polymerizable monomer | | $SP_A$ | $T_A$ [° C.] |
|---|---|---|---|---|---|---|---|---|
| | Unit | $SP_{A1}$ | Unit | $SP_{A2}$ | Unit | $SP_{A3}$ | | |
| 1 | PO2 | 9.92 | ED | 11.52 | TPA | 11.87 | 11.0 | 115.0 |
| 2 | PO2 | 9.92 | HD | 10.18 | TPA | 11.87 | 10.7 | 115.0 |
| 3 | PO2 | 9.92 | OD | 9.67 | TPA | 11.87 | 10.5 | 115.0 |

Production Example of Toner 1 amorphous polyester A1: 75 parts
crystalline polyester C1: 10 parts
Fischer-Tropsch wax (a peak temperature of 100° C. of a maximum endothermic peak): 5 parts
carbon black: 5 parts The above materials were mixed using a Henschel mixer (FM-75 type, commercially available from Mitsui Mining Co., Ltd.) at a rotation speed of 1,500 rpm for a rotation time of 5 min and then kneaded using a twin-screw kneader (PCM-30 type, commercially available from Ikegai) set at a temperature of 130° C. The obtained kneaded product was cooled and coarsely pulverized to a size of 1 mm or less with a hammer mill to obtain a coarsely crushed product. The obtained coarsely crushed product was finely pulverized with a mechanical pulverizer (T-250, commercially available from Turbo Industry Co., Ltd.). In addition, classification was performed using Faculty (F-300, commercially available from Hosokawa Micron Corporation). The operation conditions were a classifying rotor rotation speed of 11,000 rpm and a dispersion rotor rotation speed of 7,200 rpm.

The obtained particle was heated using the heat treatment device shown in the FIGURE to obtain a toner particle.

The operation conditions were a feed amount of 5 kg/hr, a hot air temperature of 160° C., a hot air flow rate of 6 m³/min., a cool air temperature of −5° C., a cool air flow rate of 4 m³/min., a blower air quantity of 20 m³/min., and an injection air flow rate of 1 m³/min.
  toner particle: 95 parts
  silica fine particle: fumed silica whose surface was treated with hexamethyldisilazane (the number-based median diameter (D50) was 120 nm) 4 parts
  small particle size inorganic fine particle: titanium oxide fine particle whose surface was treated with isobutyltrimethoxysilane (the number-based median diameter (D50) was 10 nm) 1 part The above materials were mixed using a Henschel mixer (FM-75 type, commercially available from Mitsui Miike Machinery Co., Ltd.) at a rotation speed of 1,900 rpm for a rotation time of 10 min to obtain a toner 1 exhibiting negative charging performance.

When the toner 1 was analyzed by XRD, the integrated intensity $C_T$ of the crystal structure derived from the crystalline polyester C was 3,100 cps.

When the toner 1 was analyzed by a flow tester, $T_M$ was 105.0° C., and $T_A$-$T_M$ was 10.0° C.

When the toner 1 was analyzed through FT-IR, the wax index $A_{W1}$ was 0.39, and the crystalline polyester index $A_{C1}$ was 0.010.

When the toner 1 was analyzed under a SEM, the coverage Sb with silica fine particles was 45.0 area %. When the toner 1 was treated with hexane and then analyzed under the SEM, the coverage Sa with silica fine particles was 50.0 area %.

When the toner 1 was stored in a vacuum at 50° C. for 5 days and then analyzed through FT-IR, the crystalline polyester index (after vacuum storage) $A_{C2}$ was 0.010.

Production Example of Toners 2 to 35

Toners 2 to 35 were obtained in the same operation as in the production example of the toner 1 except that, in the production example of the toner 1, the type and amount of the amorphous polyester A added, the type and amount of the crystalline polyester C added, the amount of the wax added, the presence of a heat sphering treatment, the amount of the silica fine particle added, and the external addition time were changed as shown in Table 6. The obtained physical properties are shown in Table 7.

In the X-ray diffraction spectrum at 45° C. when the temperature was raised from 25° C. to 100° C. and then lowered to 25° C. at a rate of 1° C./min, measured by the powder X-ray diffraction method using each toner, a peak corresponding to the crystalline polyester C was confirmed. In the toners 1 to 33, and 35, a peak corresponding to the crystalline polyester C was present. In the toner 34, no peak corresponding to the crystalline polyester C was present.

TABLE 6

| Toner No. | Internal addition method/production method Amorphous polyester A Type | Parts | Crystalline polyester C Type | Parts | Carbon number difference between a1 and c1 | Wax Parts | Heat sphering | External addition method/production method Silica fine particle Parts | External addition time min |
|---|---|---|---|---|---|---|---|---|---|
| 1 | 1 | 75.0 | 1 | 10.0 | 0 | 5.0 | Yes | 4.0 | 10 |
| 2 | 1 | 75.0 | 2 | 10.0 | 0 | 5.0 | Yes | 4.0 | 10 |
| 3 | 1 | 75.0 | 3 | 10.0 | 0 | 5.0 | Yes | 4.0 | 10 |
| 4 | 2 | 75.0 | 1 | 10.0 | 4 | 5.0 | Yes | 4.0 | 10 |
| 5 | 3 | 75.0 | 1 | 10.0 | 6 | 5.0 | Yes | 4.0 | 10 |
| 6 | 1 | 75.0 | 4 | 10.0 | 0 | 5.0 | Yes | 4.0 | 10 |
| 7 | 1 | 75.0 | 5 | 10.0 | 0 | 5.0 | Yes | 4.0 | 10 |
| 8 | 1 | 75.0 | 6 | 10.0 | 0 | 5.0 | Yes | 4.0 | 10 |
| 9 | 1 | 75.0 | 7 | 10.0 | 0 | 5.0 | Yes | 4.0 | 10 |
| 10 | 1 | 75.0 | 8 | 10.0 | 0 | 5.0 | Yes | 4.0 | 10 |
| 11 | 1 | 75.0 | 9 | 10.0 | 0 | 5.0 | Yes | 4.0 | 10 |
| 12 | 1 | 75.0 | 10 | 10.0 | 4 | 5.0 | Yes | 4.0 | 10 |
| 13 | 1 | 75.0 | 11 | 10.0 | 6 | 5.0 | Yes | 4.0 | 10 |
| 14 | 1 | 75.0 | 12 | 10.0 | 0 | 5.0 | Yes | 4.0 | 10 |
| 15 | 1 | 75.0 | 13 | 10.0 | 0 | 5.0 | Yes | 4.0 | 10 |
| 16 | 1 | 75.0 | 14 | 10.0 | 0 | 5.0 | Yes | 4.0 | 10 |
| 17 | 1 | 75.0 | 15 | 10.0 | 0 | 5.0 | Yes | 4.0 | 10 |
| 18 | 1 | 74.5 | 1 | 10.0 | 0 | 5.0 | Yes | 4.5 | 15 |
| 19 | 1 | 76.0 | 1 | 10.0 | 0 | 5.0 | Yes | 3.0 | 10 |
| 20 | 1 | 73.0 | 1 | 10.0 | 0 | 5.0 | Yes | 6.0 | 10 |
| 21 | 1 | 72.5 | 1 | 15.0 | 0 | 2.5 | Yes | 4.0 | 10 |
| 22 | 1 | 78.0 | 1 | 10.0 | 0 | 2.0 | Yes | 4.0 | 10 |
| 23 | 1 | 73.0 | 1 | 10.0 | 0 | 7.0 | Yes | 4.0 | 10 |
| 24 | 1 | 80.0 | 1 | 5.0 | 0 | 5.0 | Yes | 4.0 | 10 |
| 25 | 1 | 65.0 | 1 | 20.0 | 0 | 5.0 | Yes | 4.0 | 10 |
| 26 | 1 | 74.0 | 1 | 10.0 | 0 | 5.0 | Yes | 5.0 | 20 |
| 27 | 1 | 76.5 | 1 | 10.0 | 0 | 5.0 | Yes | 2.5 | 10 |
| 28 | 1 | 72.5 | 1 | 10.0 | 0 | 5.0 | Yes | 6.5 | 10 |
| 29 | 1 | 71.5 | 1 | 16.0 | 0 | 2.5 | Yes | 4.0 | 10 |
| 30 | 1 | 78.5 | 1 | 10.0 | 0 | 1.5 | Yes | 4.0 | 10 |
| 31 | 1 | 72.5 | 1 | 10.0 | 0 | 7.5 | Yes | 4.0 | 10 |
| 32 | 1 | 81.0 | 1 | 4.0 | 0 | 5.0 | Yes | 4.0 | 10 |
| 33 | 1 | 64.0 | 1 | 21.0 | 0 | 5.0 | Yes | 4.0 | 10 |
| 34 | 1 | 75.0 | 16 | 10.0 | 4 | 5.0 | Yes | 4.0 | 10 |
| 35 | 1 | 72.5 | 1 | 10.0 | 0 | 7.5 | No | 4.0 | 10 |

The column of "Heat sphering" in Table 6 indicates whether the heat sphering treatment was performed or not. "Yes" indicates that the heat sphering treatment was performed, and "No" indicates that the heat sphering treatment was not performed.

TABLE 7

| Toner No. | Physical properties XRD $W_C$ mass % | $C_T$ | $C_T/(C_C \times W_C)$ | Flow tester $T_M$ | $T_A - T_M$ | FT-IR $A_{W1}$ | $A_{C1}$ | $A_{C2}$ | $A_{C2}/A_{C1}$ | SEM Sb | Sa |
|---|---|---|---|---|---|---|---|---|---|---|---|
| 1 | 10 | 3100 | 0.8 | 105.0 | 10.0 | 0.39 | 0.010 | 0.010 | 1.0 | 45.0 | 50.0 |
| 2 | 10 | 3100 | 0.8 | 105.0 | 10.0 | 0.35 | 0.030 | 0.033 | 1.1 | 45.0 | 50.0 |
| 3 | 10 | 3100 | 0.8 | 105.0 | 10.0 | 0.33 | 0.050 | 0.060 | 1.2 | 45.0 | 50.0 |
| 4 | 10 | 3100 | 0.8 | 105.0 | 10.0 | 0.39 | 0.010 | 0.010 | 1.0 | 45.0 | 50.0 |
| 5 | 10 | 3100 | 0.8 | 105.0 | 10.0 | 0.39 | 0.010 | 0.010 | 1.0 | 45.0 | 50.0 |
| 6 | 10 | 3100 | 0.8 | 105.0 | 10.0 | 0.39 | 0.010 | 0.010 | 1.0 | 45.0 | 50.0 |
| 7 | 10 | 3100 | 0.8 | 105.0 | 10.0 | 0.39 | 0.010 | 0.010 | 1.0 | 45.0 | 50.0 |
| 8 | 10 | 3100 | 0.8 | 105.0 | 10.0 | 0.39 | 0.010 | 0.010 | 1.0 | 45.0 | 50.0 |
| 9 | 10 | 3100 | 0.8 | 105.0 | 10.0 | 0.39 | 0.010 | 0.010 | 1.0 | 45.0 | 50.0 |
| 10 | 10 | 3050 | 0.8 | 105.0 | 10.0 | 0.39 | 0.010 | 0.010 | 1.0 | 45.0 | 50.0 |
| 11 | 10 | 3000 | 0.8 | 105.0 | 10.0 | 0.39 | 0.010 | 0.010 | 1.0 | 45.0 | 50.0 |
| 12 | 10 | 3200 | 0.8 | 105.0 | 10.0 | 0.39 | 0.010 | 0.010 | 1.0 | 45.0 | 50.0 |
| 13 | 10 | 3300 | 0.8 | 105.0 | 10.0 | 0.39 | 0.010 | 0.010 | 1.0 | 45.0 | 50.0 |
| 14 | 10 | 2800 | 0.7 | 105.0 | 10.0 | 0.39 | 0.010 | 0.010 | 1.0 | 45.0 | 50.0 |
| 15 | 10 | 2500 | 0.6 | 105.0 | 10.0 | 0.39 | 0.010 | 0.010 | 1.0 | 45.0 | 50.0 |

TABLE 7-continued

| | | | | | Physical properties | | | | | | |
|---|---|---|---|---|---|---|---|---|---|---|---|
| | | XRD | | | | FT-IR | | | | | |
| Toner | $W_C$ | | $C_T/$ | Flow tester | | | | $A_{C2}/$ | | SEM | |
| No. | mass % | $C_T$ | $(C_C \times W_C)$ | $T_M$ | $T_A - T_M$ | $A_{W1}$ | $A_{C1}$ | $A_{C2}$ | $A_{C1}$ | Sb | Sa |
| 16 | 10 | 3500 | 0.9 | 105.0 | 10.0 | 0.39 | 0.010 | 0.010 | 1.0 | 45.0 | 50.0 |
| 17 | 10 | 4000 | 1.0 | 105.0 | 10.0 | 0.39 | 0.010 | 0.010 | 1.0 | 45.0 | 50.0 |
| 18 | 10 | 3100 | 0.8 | 105.0 | 10.0 | 0.39 | 0.010 | 0.010 | 1.0 | 45.0 | 47.0 |
| 19 | 10 | 3100 | 0.8 | 105.0 | 10.0 | 0.39 | 0.010 | 0.010 | 1.0 | 40.0 | 45.0 |
| 20 | 10 | 3100 | 0.8 | 105.0 | 10.0 | 0.39 | 0.010 | 0.010 | 1.0 | 60.0 | 65.0 |
| 21 | 15 | 3100 | 0.5 | 100.0 | 15.0 | 0.33 | 0.100 | 0.150 | 1.5 | 45.0 | 50.0 |
| 22 | 10 | 3100 | 0.8 | 105.0 | 10.0 | 0.29 | 0.050 | 0.080 | 1.6 | 45.0 | 50.0 |
| 23 | 10 | 3100 | 0.8 | 105.0 | 10.0 | 0.45 | 0.009 | 0.009 | 1.0 | 45.0 | 50.0 |
| 24 | 5 | 3100 | 1.6 | 108.0 | 7.0 | 0.39 | 0.010 | 0.010 | 1.0 | 45.0 | 50.0 |
| 25 | 20 | 3100 | 0.4 | 95.0 | 20.0 | 0.39 | 0.010 | 0.010 | 1.0 | 45.0 | 50.0 |
| 26 | 10 | 3100 | 0.8 | 105.0 | 10.0 | 0.39 | 0.010 | 0.010 | 1.0 | 45.0 | 44.0 |
| 27 | 10 | 3100 | 0.8 | 105.0 | 10.0 | 0.39 | 0.010 | 0.010 | 1.0 | 38.0 | 45.0 |
| 28 | 10 | 3100 | 0.8 | 105.0 | 10.0 | 0.39 | 0.010 | 0.010 | 1.0 | 62.0 | 65.0 |
| 29 | 16 | 3100 | 0.5 | 99.0 | 16.0 | 0.39 | 0.110 | 0.110 | 1.0 | 45.0 | 50.0 |
| 30 | 10 | 3100 | 0.8 | 105.0 | 10.0 | 0.28 | 0.050 | 0.090 | 1.8 | 45.0 | 50.0 |
| 31 | 10 | 3100 | 0.8 | 105.0 | 10.0 | 0.46 | 0.008 | 0.008 | 1.0 | 45.0 | 50.0 |
| 32 | 4 | 3100 | 1.9 | 109.0 | 6.0 | 0.39 | 0.010 | 0.010 | 1.0 | 45.0 | 50.0 |
| 33 | 21 | 3100 | 0.4 | 94.0 | 21.0 | 0.39 | 0.010 | 0.010 | 1.0 | 45.0 | 50.0 |
| 34 | 10 | 0 | 0.0 | 105.0 | 10.0 | 0.39 | 0.010 | 0.010 | 1.0 | 45.0 | 50.0 |
| 35 | 10 | 3100 | 0.8 | 105.0 | 10.0 | 0.28 | 0.050 | 0.090 | 1.8 | 45.0 | 50.0 |

Production Example of Magnetic Carrier 1

Magnetite 1 having a number average particle diameter of 0.30 µm (magnetization strength of 65 Am²/kg under a magnetic field of 1000/4π (kA/m))

Magnetite 2 having a number average particle diameter of 0.50 µm (magnetization strength of 65 Am²/kg under a magnetic field of 1000/4π (kA/m))

A total of 4.0 parts of a silane compound (3-(2-aminoethylaminopropyl) trimethoxysilane) was added to 100 parts of each of the above materials, and the components were mixed and stirred at a high speed and at 100° C. or higher in a container to obtain fine particles of each type.

Phenol: 10% by mass

Formaldehyde solution: 6% by mass (formaldehyde 40% by mass, methanol 10% by mass, water 50% by mass)

Magnetite 1 treated with the silane compound: 58% by mass

Magnetite 2 treated with the silane compound: 26% by mass

A total of 100 parts of the above materials, 5 parts of a 28% by mass ammonia aqueous solution, and 20 parts of water were placed in a flask, the temperature was raised to 85° C. in 30 min and maintained while stirring and mixing, held for 3 h and the polymerization reaction was carried out, and the generated phenol resin was cured. Then, the cured phenol resin was cooled to 30° C., water was further added, the supernatant was removed, and the precipitate was washed with water, and then air-dried. Then, drying was performed under reduced pressure (5 mm Hg or less) at a temperature of 60° C. to obtain a magnetic body dispersion type spherical magnetic carrier 1. The volume-based 50% particle diameter (D50) of the magnetic carrier 1 was 34.21

Production Example of Two-Component Developer 1

A total of 8.0 parts of toner 1 was added to 92.0 parts of the magnetic carrier 1 and mixing was performed with a V-type mixer (V-20, manufactured by Seishin Enterprise Co., Ltd.) to obtain a two-component developer 1.

Production Examples of Two-Component Developers 2 to 35

Two-component developers 2 to 35 were obtained in the same manner as in the production example of two-component developer 1, except that changed as shown in Table 11.

TABLE 8

| | Two-component developer | Toner | Magnetic carrier |
|---|---|---|---|
| Example 1 | 1 | 1 | 1 |
| Example 2 | 2 | 2 | 1 |
| Example 3 | 3 | 3 | 1 |
| Example 4 | 4 | 4 | 1 |
| Example 5 | 5 | 5 | 1 |
| Example 6 | 6 | 6 | 1 |
| Example 7 | 7 | 7 | 1 |
| Example 8 | 8 | 8 | 1 |
| Example 9 | 9 | 9 | 1 |
| Example 10 | 10 | 10 | 1 |
| Example 11 | 11 | 11 | 1 |
| Example 12 | 12 | 12 | 1 |
| Example 13 | 13 | 13 | 1 |
| Example 14 | 14 | 14 | 1 |
| Example 15 | 15 | 15 | 1 |
| Example 16 | 16 | 16 | 1 |
| Example 17 | 17 | 17 | 1 |
| Example 18 | 18 | 18 | 1 |
| Example 19 | 19 | 19 | 1 |
| Example 20 | 20 | 20 | 1 |
| Example 21 | 21 | 21 | 1 |
| Example 22 | 22 | 22 | 1 |
| Example 23 | 23 | 23 | 1 |
| Example 24 | 24 | 24 | 1 |
| Example 25 | 25 | 25 | 1 |
| Comparative Example 1 | 26 | 26 | 1 |
| Comparative Example 2 | 27 | 27 | 1 |
| Comparative Example 3 | 28 | 28 | 1 |
| Comparative Example 4 | 29 | 29 | 1 |
| Comparative Example 5 | 30 | 30 | 1 |
| Comparative Example 6 | 31 | 31 | 1 |
| Comparative Example 7 | 32 | 32 | 1 |

TABLE 8-continued

|  | Two-component developer | Toner | Magnetic carrier |
|---|---|---|---|
| Comparative Example 8 | 33 | 33 | 1 |
| Comparative Example 9 | 34 | 34 | 1 |
| Comparative Example 10 | 35 | 35 | 1 |

Example 1

Evaluation was performed using the two-component developer 1.

As an image forming device, a digital commercial printing printer imageRUNNER ADVANCE C5560 modified machine (commercially available from Canon Inc.) was used, and a two-component developer 1 was placed in a cyan developing device. As modifications of the device, a fixation temperature, a processing speed, a DC voltage $V_{DC}$ of a developer bearing member, a charging voltage $V_D$ of an electrostatic latent image bearing member, and a laser power could be freely set and changed. Image output evaluation was performed by outputting an FFh image (solid image) with a desired image ratio, and adjusting $V_{DC}$, $V_D$, and the laser power so that the amount of the toner of the FFh image laid on paper was a desired value, and the following evaluation was performed. FFh is a value indicating 256 gradations in hexadecimal, 00h is the 1st gradation (white background) of 256 gradations, and FFh is the 256th gradation (solid portion) of 256 gradations. Evaluation was performed based on the following evaluation method, and the results are shown in Table 9.

Image Heat Resistance

Paper: Image Coat Gloss 158 (158.0 g/m²)
(commercially available from Canon Marketing Japan Inc.)
Amount of toner laid on paper: 0.50 mg/cm² (2Fh image)
(adjusted by the DC voltage $V_{DC}$ of the developer bearing member, the charging voltage
$V_D$ of the electrostatic latent image bearing member and the laser power)
Evaluation image: place a 5 cm×5 cm image in the center of the above A4 paper
Fixing test environment: normal temperature and normal humidity environment (a temperature of 23° C./a humidity of 50% RH (hereinafter referred to as N/N))
Fixation temperature: 180° C.
Processing speed: 377 mm/sec The evaluation image was output and the image heat resistance was evaluated. First, the image portion of the evaluation image was covered with the same evaluation paper, a paper bundle (Image Coat Gloss 500 sheets) was loaded thereon and the sample was put into a thermostatic tank set at a temperature of 65° C./a humidity of 41% RH and left for 3 hours. Then, the sample was taken out from the thermostatic tank, and the evaluation image and the evaluation paper covering it were both peeled off. The transfer amount of the evaluation image was digitized using image processing software Image-Pro Plus5.1J (commercially available from Media Cybernetics, Inc.). The evaluation image area was a ratio of the area of the image transferred to the covered evaluation paper relative to the area of the covered evaluation paper.

Then, the transfer amount was calculated using the following formula. The obtained transfer amount was evaluated according to the following evaluation criteria. If the evaluation was A to C, it was determined to be good.

transfer amount(area %)=image transfer area/evaluation image area×100

Evaluation Criteria
A: less than 1.0 area %
B: 1.0 area % or more and less than 2.0 area %
C: 2.0 area % or more and less than 4.0 area %
D: 4.0 area % or more Low-Temperature Fixability Paper: GFC-081 (81.0 g/m²) (commercially available from Canon Marketing Japan Inc.)
Amount of toner laid on paper: 0.50 mg/cm²
(adjusted by the DC voltage Vic of the developer bearing member, the charging voltage
$V_D$ of the electrostatic latent image bearing member and the laser power)
Evaluation image: place a 2 cm×5 cm image in the center of the above A4 paper
Test environment: low temperature and low humidity environment: a temperature of 15° C./a humidity of 10% RH (hereinafter referred to as "L/L")
Fixation temperature: 150° C.
Processing speed: 377 mm/sec The evaluation image was output and the low-temperature fixability was evaluated. The value of the rate of decrease in image density was used as an evaluation index for the low-temperature fixability.

Using an X-Rite Color Reflection Densitometer (500 series: commercially available from X-Rite), first, the image density at the center was measured. Next, a load of 4.9 kPa (50 g/cm²) was applied to the portion in which the image density was measured, the fixed image was rubbed (5 reciprocations) with lens-cleaning paper, and the image density was measured again.

Then, the rate of decrease in image density before and after friction was calculated using the following formula. The obtained rate of decrease in image density was evaluated according to the following evaluation criteria. If the evaluation was A to C, it was determined to be good.

Rate of decrease of image density (%)={(image density before friction)−(image density after friction)}/image density before friction×100

Evaluation Criteria
A: the rate of decrease in image density was less than 3%
B: the rate of decrease in image density was 3% or more and less than 5%
C: the rate of decrease in image density was 5% or more and less than 8%
D: the rate of decrease in image density was 8% or more Charging Performance After Accelerated Blooming Test Paper: GFC-081 (81.0 g/m²) (commercially available from Canon Marketing Japan Inc.)
Amount of toner laid on paper: 0.35 mg/cm²
(adjusted by the DC voltage Vic of the developer bearing member, the charging voltage
$V_D$ of the electrostatic latent image bearing member and the laser power)
Evaluation image: place a 2 cm×5 cm image in the center of the above A4 paper Fixing test environment: high temperature and high humidity environment: a temperature of 30° C./a humidity of 80% RH (hereinafter referred to as "H/H")

Processing speed: 377 mm/sec

When the toner on the electrostatic latent image bearing member was sucked and collected through a metal cylindrical tube and a cylindrical filter, the triboelectric charge quantity of the toner was calculated. Specifically, the triboelectric charge quantity of the toner on the electrostatic latent image bearing member was measured by a Faraday-Cage.

The Faraday-Cage had a coaxial double cylinder, and the inner cylinder and the outer cylinder were insulated. If a charged component with a charge amount of Q was put into the inner cylinder, it was as if there was a metal cylinder with a charge amount of Q according to electrostatic induction. The amount of the induced charge was measured with an electrometer (Keithley 6517A commercially available from Keithley), and (Q/M) obtained by dividing the charge amount Q(mC) by the toner mass M(kg) in the inner cylinder was obtained as the triboelectric charge quantity of the toner.

Triboelectric charge quantity of toner (mC/Kg)=$Q/M$

First, the evaluation image was formed on the electrostatic latent image bearing member, and before it was transferred to an intermediate transfer member, rotation of the electrostatic latent image bearing member was stopped, the toner on the electrostatic latent image bearing member was sucked and collected through a metal cylindrical tube and a cylindrical filter, and the initial Q/M was measured.

Then, the two-component developer was put into a vacuum dryer set at 50° C. and left for 5 days, and the accelerated blooming test of the crystalline polyester was performed. Then, the two-component developer was taken out from the air dryer and Q/M after the accelerated test was measured. That is, the evaluation image was formed on the electrostatic latent image bearing member, and before it was transferred to an intermediate transfer member, rotation of the electrostatic latent image bearing member was stopped, the toner on the electrostatic latent image bearing member was sucked and collected through a metal cylindrical tube and a cylindrical filter, and Q/M after the accelerated test was measured.

Then, the rate of decrease in retention rate of Q/M before and after the accelerated test was calculated using the following formula. The obtained retention rate of Q/M was evaluated according to the following evaluation criteria. If the evaluation was A to C, it was determined to be good.

Retention rate of $Q/M(\%) = (Q/M$ after accelerated test$)/($initial $Q/M) \times 100$ (Evaluation Criteria)
A: the retention rate was 95% or more
B: the retention rate was 90% or more and less than 95%
C: the retention rate was 85% or more and less than 90%
D: the retention rate was less than 85%

Examples 2 to 25 and Comparative Examples 1 to 10

Evaluation was performed in the same manner as in Example 1 except that the two-component developers 2 to 35 were used.

The evaluation results are shown in Table 9.

TABLE 9

|  | Low-temperature fixability | | | Heat resistance and pressure resistance | | Charging performance after accelerated test | | | |
|---|---|---|---|---|---|---|---|---|---|
|  | | Image density | | | | | Q/M | | |
|  | | | | | | | | after | |
|  | | before friction | after friction | Rate of decrease | | Transfer amount | | Initial | accelerated test | Retention rate |
| Example 1 | A | 1.35 | 1.32 | 2% | A | 0.0% | A | 36 | 36 | 100% |
| Example 2 | A | 1.35 | 1.32 | 2% | A | 0.0% | B | 36 | 33 | 92% |
| Example 3 | A | 1.35 | 1.32 | 2% | A | 0.0% | C | 36 | 32 | 89% |
| Example 4 | B | 1.35 | 1.31 | 3% | A | 0.0% | A | 36 | 36 | 100% |
| Example 5 | C | 1.35 | 1.28 | 5% | A | 0.0% | A | 36 | 36 | 100% |
| Example 6 | A | 1.35 | 1.32 | 2% | B | 1.8% | A | 36 | 36 | 100% |
| Example 7 | A | 1.35 | 1.32 | 2% | C | 2.5% | A | 36 | 36 | 100% |
| Example 8 | A | 1.35 | 1.32 | 2% | B | 1.8% | A | 36 | 36 | 100% |
| Example 9 | A | 1.35 | 1.32 | 2% | C | 2.5% | A | 36 | 36 | 100% |
| Example 10 | A | 1.35 | 1.32 | 2% | B | 1.8% | A | 36 | 36 | 100% |
| Example 11 | A | 1.35 | 1.32 | 2% | C | 2.5% | A | 36 | 36 | 100% |
| Example 12 | B | 1.35 | 1.31 | 3% | A | 0.0% | A | 36 | 36 | 100% |
| Example 13 | C | 1.35 | 1.28 | 5% | A | 0.0% | A | 36 | 36 | 100% |
| Example 14 | A | 1.35 | 1.32 | 2% | B | 1.8% | A | 36 | 36 | 100% |
| Example 15 | A | 1.35 | 1.32 | 2% | C | 2.5% | A | 36 | 36 | 100% |
| Example 16 | B | 1.35 | 1.31 | 3% | A | 0.0% | A | 36 | 36 | 100% |
| Example 17 | C | 1.35 | 1.28 | 5% | A | 0.0% | A | 36 | 36 | 100% |
| Example 18 | A | 1.35 | 1.32 | 2% | A | 0.0% | B | 36 | 33 | 92% |
| Example 19 | A | 1.35 | 1.32 | 2% | A | 0.0% | B | 36 | 33 | 92% |
| Example 20 | B | 1.35 | 1.31 | 3% | A | 0.0% | A | 36 | 36 | 100% |
| Example 21 | A | 1.35 | 1.32 | 2% | A | 0.0% | C | 36 | 32 | 89% |
| Example 22 | A | 1.35 | 1.32 | 2% | A | 0.0% | C | 36 | 32 | 89% |
| Example 23 | A | 1.35 | 1.32 | 2% | A | 0.0% | C | 36 | 32 | 89% |
| Example 24 | B | 1.35 | 1.31 | 3% | A | 0.0% | A | 36 | 36 | 100% |
| Example 25 | A | 1.35 | 1.32 | 2% | C | 2.5% | A | 36 | 36 | 100% |
| Comparative Example 1 | A | 1.35 | 1.32 | 2% | A | 0.0% | D | 36 | 30 | 83% |
| Comparative Example 2 | A | 1.35 | 1.32 | 2% | A | 0.0% | D | 36 | 30 | 83% |

TABLE 9-continued

| | | Low-temperature fixability | | | Heat resistance and pressure resistance | | Charging performance after accelerated test Q/M | | |
| --- | --- | --- | --- | --- | --- | --- | --- | --- | --- |
| | | Image density | | Rate of decrease | | Transfer amount | Initial | after accelerated test | Retention rate |
| | | before friction | after friction | | | | | | |
| Comparative Example 3 | D | 1.35 | 1.22 | 10% | A | 0.0% | A | 36 | 36 | 100% |
| Comparative Example 4 | A | 1.35 | 1.32 | 2% | A | 0.0% | D | 36 | 28 | 78% |
| Comparative Example 5 | A | 1.35 | 1.32 | 2% | A | 0.0% | D | 36 | 28 | 78% |
| Comparative Example 6 | A | 1.35 | 1.32 | 2% | A | 0.0% | D | 36 | 28 | 78% |
| Comparative Example 7 | D | 1.35 | 1.22 | 10% | A | 0.0% | A | 36 | 36 | 100% |
| Comparative Example 8 | A | 1.35 | 1.32 | 2% | D | 4.0% | D | 36 | 28 | 78% |
| Comparative Example 9 | A | 1.35 | 1.32 | 2% | D | 7.0% | A | 36 | 36 | 100% |
| Comparative Example 10 | A | 1.35 | 1.32 | 2% | A | 0.0% | D | 36 | 28 | 78% |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2022-046564, filed Mar. 23, 2022, and Japanese Patent Application No. 2023-014757, filed Feb. 2, 2023, which are hereby incorporated by reference herein in their entirety.

What is claimed is:

1. A toner comprising
a toner particle comprising a binder resin and a wax, and a silica fine particle on a surface of the toner particle,
wherein the binder resin comprises an amorphous polyester A and a crystalline polyester C,
wherein, when a content of the crystalline polyester C in the toner based on a mass of the toner is defined as $W_C$ (mass %), the $W_C$ satisfies following Formula (1), $$5.0 \leq W_C \leq 20.0 \tag{1}$$

wherein, when a softening point of the amorphous polyester A measured with a flow tester is defined as $T_A$ (° C.), and a softening point of a molten mixture obtained by mixing the amorphous polyester A and the crystalline polyester C at a mass ratio of the amorphous polyester A and the crystalline polyester C in the toner is defined as $T_M$ (° C.), the $T_A$ and the $T_M$ satisfy following Formula (2), $$7.0 \leq T_A - T_M \leq 20.0 \tag{2}$$

wherein, in an X-ray diffraction spectrum at 45° C. when a temperature is raised from 25° C. to 100° C. and then lowered to 25° C. at a rate of 1° C./min, which is measured by a powder X-ray diffraction method for the toner, there is a peak corresponding to the crystalline polyester C,
wherein a wax index $A_{W1}$ and a crystalline polyester index $A_{C1}$ calculated by following formula based on an FT-IR spectrum measured using an ATR method, using Ge as an ATR crystal, and under a condition of an angle of incidence of 45° of infrared light satisfy following Formula (3) and following Formula (4), $$0.29 \leq A_{W1} \leq 0.45 \tag{3}$$

$$0.009 \leq A_{C1} \leq 0.100 \tag{4}$$

$A_{W1}$=(an intensity of a peak belonging to —CH$_2$— derived from the wax in the toner)/(an intensity of a peak belonging to carbonyl derived from the amorphous polyester in the toner)
$A_{C1}$=(an intensity of a peak belonging to —CH$_2$— derived from the crystalline polyester in the toner)/(an intensity of a peak belonging to carbonyl derived from the amorphous polyester in the toner), and
wherein the silica fine particle comprises a silica fine particle A having a maximum diameter of primary particle of 80 to 135 nm, and when an average coverage of the surface of the toner with the silica fine particle A having a maximum diameter of primary particle of 80 to 135 nm, which is measured by observing the toner under a scanning electron microscope, is defined as Sb (area %), and an average coverage of the surface of the toner with the silica fine particle A having a maximum diameter of primary particle of 80 to 135 nm, which is measured by observing the toner that has been treated with hexane under a scanning electron microscope is defined as Sa (area %),
Sb and Sa satisfy following Formulae (5) and (6):

$$40.0 \leq Sb \leq 60.0 \tag{5}$$

$$Sb \leq Sa \tag{6}$$

2. The toner according to claim 1,
wherein, when an integrated intensity of a crystal structure of the crystalline polyester C is defined as $C_C$ in an X-ray diffraction spectrum at 45° C. when the temperature is raised from 25° C. to 100° C. and then lowered to 25° C. at a rate of 1° C./min, which is measured by a powder X-ray diffraction method for the crystalline polyester C, and
an integrated intensity of a crystal structure of the crystalline polyester C is defined as $C_T$ in an X-ray diffraction spectrum at 45° C. when the temperature is raised from 25° C. to 100° C. and then lowered to 25° C. at a rate of 1° C./min, which is measured by a powder X-ray diffraction method for the toner,
the $C_C$, the $C_T$, and the Wc satisfy following Formula (7):

$$0.7 \leq C_T/(C_C \times W_C) \leq 0.9 \quad (7).$$

3. The toner according to claim 1,
wherein the crystalline polyester C is a condensation polymer of an alcohol component containing a linear aliphatic polyhydric alcohol c1 having 2 to 6 carbon atoms and a carboxylic acid component containing a linear aliphatic polycarboxylic acid c2, and
wherein a difference between a number of carbon atoms of the linear aliphatic polyhydric alcohol c1 and a number of carbon atoms of the linear aliphatic polycarboxylic acid c2 is 8 or more.

4. The toner according to claim 3,
wherein the amorphous polyester A is a condensation polymer of an alcohol component containing an linear aliphatic polyhydric alcohol a1 having 2 to 10 carbon atoms and a carboxylic acid component, and
wherein a difference between a number of carbon atoms of the linear aliphatic polyhydric alcohol a1 and a number of carbon atoms of the linear aliphatic polyhydric alcohol c1 is 4 or less.

5. The toner according to claim 1,
wherein, when a melting point (° C.) of the crystalline polyester C is defined as $T_C$, the $T_C$ satisfies following Formula (8):

$$87 \leq T_C \leq 92 \quad (8).$$

6. The toner according to claim 1,
wherein, when a crystalline polyester index (after vacuum storage) calculated from an FT-IR spectrum obtained using the toner stored in a vacuum at 50° C. for 5 days as a sample, using an ATR method, using Ge as an ATR crystal and under a condition of an angle of incidence of 45° of infrared light is defined as $A_{C2}$, the $A_{C1}$ and the $A_{C2}$ satisfy following Formula (9):

$$A_{C2}/A_{C1} \leq 1.2 \quad (9).$$

7. The toner according to claim 1,
wherein the wax comprises a hydrocarbon wax.

8. The toner according to claim 1,
wherein the toner particle is a pulverized toner particle.

9. A two-component developer comprising a toner and a magnetic carrier,
wherein the toner is the toner according to claim 1.

* * * * *